(12) United States Patent
Aziz et al.

(10) Patent No.: US 12,480,003 B2
(45) Date of Patent: Nov. 25, 2025

(54) ANTICORROSIVE NANOCOMPOSITE

(71) Applicant: KING FAHD UNIVERSITY OF PETROLEUM AND MINERALS, Dhahran (SA)

(72) Inventors: Md. Abdul Aziz, Dhahran (SA); Shaik Inayath Basha, Dhahran (SA); Mohammed Maslehuddin, Dhahran (SA); Shamsad Ahmad, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 691 days.

(21) Appl. No.: 17/859,689

(22) Filed: Jul. 7, 2022

(65) Prior Publication Data

US 2024/0010846 A1   Jan. 11, 2024

(51) Int. Cl.
 *C09D 5/08*   (2006.01)
 *C09D 7/63*   (2018.01)
 *C09D 163/00* (2006.01)

(52) U.S. Cl.
 CPC .............. *C09D 5/086* (2013.01); *C09D 7/63* (2018.01); *C09D 163/00* (2013.01)

(58) Field of Classification Search
 CPC ... C08K 3/04; C08K 3/36; C08K 3/34; C08K 5/17; C08K 2201/005; C08K 2201/011; C08K 3/22; C08K 9/04; C08K 2003/2241; C08K 3/014; C08K 3/042; C08K 3/08; C08K 5/053; C08K 5/06; C08K 5/16; C08K 7/00; C08K 13/06; C08K 2003/2227; C08K 5/1515; C08K 9/08; C08L 63/00; C08L 79/02; C08L 101/12; C08L 2666/22; C08L 33/08; C08L 5/08; C08L 77/00; C08L 91/06; C08L 17/00; C08L 2666/54; C08L 71/02; C09C 1/44; C09C 3/041; C09C 3/006; C09C 3/10; C01P 2002/72; C01P 2002/82; C01P 2002/85; C01P 2004/03; C01P 2004/04; C01P 2004/61; C01P 2004/62; C01P 2006/40
 See application file for complete search history.

(56) References Cited

U.S. PATENT DOCUMENTS 9,637,617 B2    5/2017  Su
12,146,072 B2 * 11/2024 Aziz ............. C09D 7/70

FOREIGN PATENT DOCUMENTS

CN   107325686 A     11/2017
GB      2581213 A  *  8/2020 ............ C09D 5/084
JP    2003-192459     7/2003

OTHER PUBLICATIONS

Jin et al. Materials Science and Engineering, 2008, 478, 402-405 (Year: 2008).*

(Continued)

*Primary Examiner* — Amber R Orlando
*Assistant Examiner* — Ryan Patrick Loughran
(74) *Attorney, Agent, or Firm* — Oblon, McClelland, Maier & Neustadt, L.L.P.

(57) ABSTRACT

An anticorrosive nanocomposite is described. The anticorrosive nanocomposite includes a cured epoxy and jute carbon. The jute carbon is in the form of flakes. The flakes have a particle size of 0.05-15 micrometers (μm). Particles of the jute carbon are dispersed in the cured epoxy. A method of preparing the jute carbon is also described.

10 Claims, 26 Drawing Sheets

(56) References Cited

OTHER PUBLICATIONS

Manasa et al. Journal of Energy Storage, 2020, 30, 101494 (Year: 2020).*

Al-Nami, et al. ; Preparation of photoluminescent and anticorrosive epoxy paints immobilized with nanoscale graphene from sugarcane bagasse agricultural waste ; Environmental Science and Pollution Research (2022) ; Apr. 13, 2022 ; Abstract Only ; 19 Pages.

Kaya, et al. ; Sustainable bean pod/calcined kaolin reinforced epoxy hybrid composites with enhanced mechanical, water sorption and corrosion resistance properties ; Construction and Building Materials, vol. 162 ; Feb. 20, 2018 ; pp. 272-279 ; Abstract Only ; 4 Pages.

Yu, et al. ; Eco-friendly functionalization of hexagonal boron nitride nanosheets with carbon dots towards reinforcement of the protective performance of water-borne epoxy coating ; New Journal of Chemistry, Issue 13, 2022 ; Abstract Only ; 5 Pages.

Rahman, et al. ; Lignin nanoparticles: synthesis, characterization and corrosion protection performance ; New Journal of Chemistry, Issue 5, 2018 ; Abstract Only ; 5 Pages.

* cited by examiner

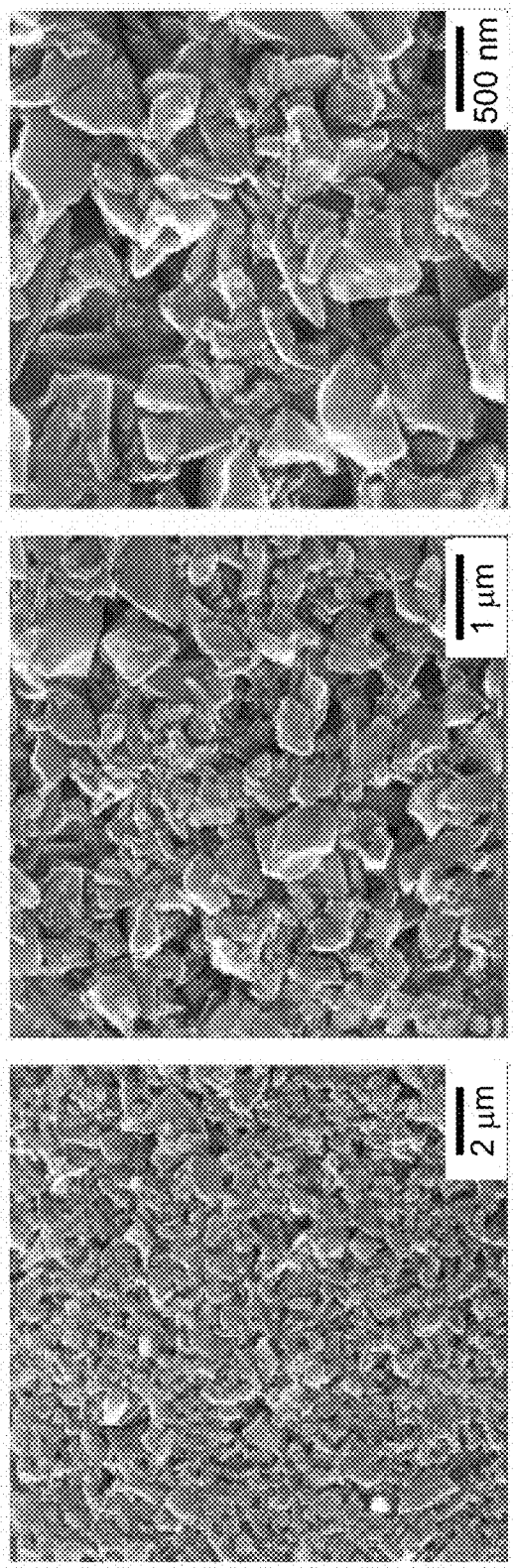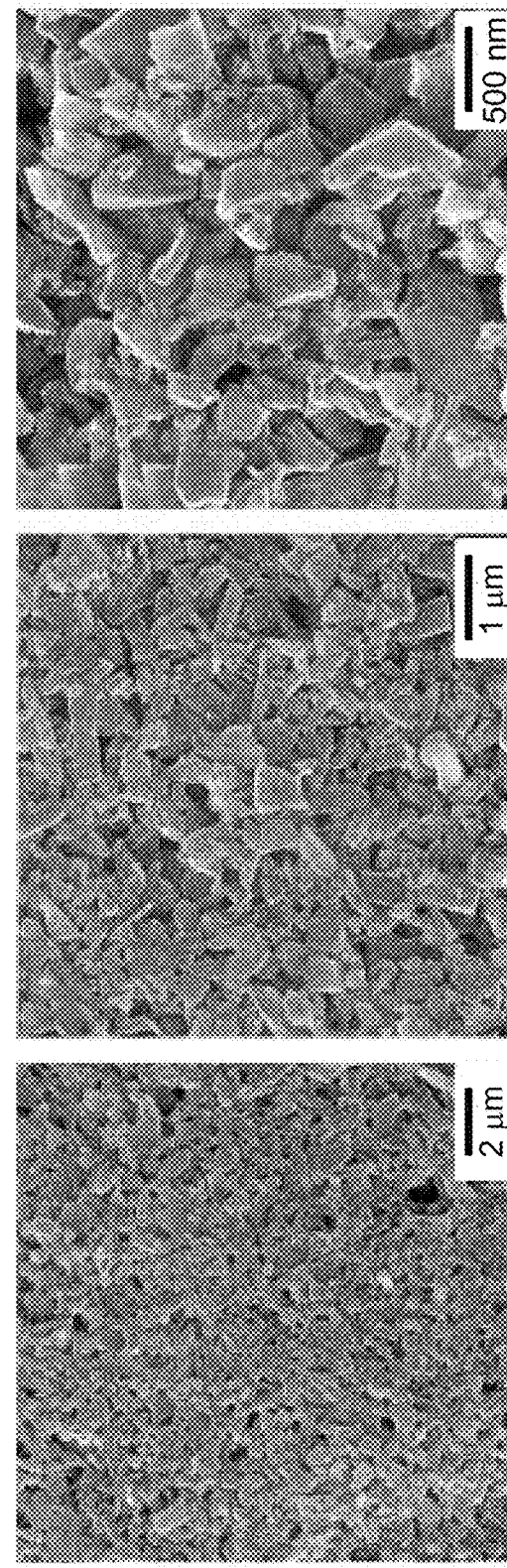

Neat epoxy coating

Composite epoxy coating

ANTICORROSIVE NANOCOMPOSITE

STATEMENT OF PRIOR DISCLOSURE BY THE INVENTORS

Aspects of the present disclosure are described in S. I. Basha, Md. A. Aziz, M. Maslehuddin, S. Ahmad. "Preparation, Characterization, and Evaluation of the Anticorrosion Performance of Submicron-/Nano-carbon from Jute Sticks", Sep. 16, 2021; Chem. Asian J. 16, 3914. incorporated herein by reference in its entirety.

BACKGROUND

Technical Field

The present disclosure is directed to a nanocomposite, and particularly to an anticorrosive nanocomposite, and a method of preparing various components of the anticorrosive nanocomposite.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Metals and alloys such as mild steel (MS) exhibit applications in various sectors, including marine, oil and gas, petrochemicals, chemical refineries, and automobile industries. However, the degradation of MS components in an unfavorable environment limits the practical application of the MS components in such sectors. Various corrosion inhibitors such as alkyd-based coatings, oil-based coatings using natural oils, water emulsion-based coatings, urethane-based coatings, chlorinated rubber-based coatings, vinyl-based coatings, and epoxy-based coatings have been developed in the past to inhibit corrosion. Such polymers work by creating a barrier between a metal surface and the surrounding environment, preventing the penetration of corrosive ions through the coating to the metal surface, thereby protecting the metal from corrosion.

However, such coatings bring harm to human health and the environment. Also, most of the conventionally used corrosion-resistant coatings lack effective corrosion-resistant behavior on exposure to marine or industrial environmental conditions. Further, the high cost of their manufacture is a significant drawback of such conventional coatings. Hence, there is a need for an efficient, long-lasting, and inexpensive corrosion-resistant coating that may overcome the aforementioned limitations.

SUMMARY

In an exemplary embodiment, an anticorrosive nanocomposite is described. The anticorrosive nanocomposite includes a cured epoxy and jute carbon. The jute carbon is in the form of flakes, wherein the flakes have flat top and bottom surfaces that are coplanar. The flakes have a particle size of 0.05-15 micrometers ($\mu m$). Particles of the jute carbon are dispersed in the cured epoxy.

In some embodiments, the flakes have a particle size of 10-15 $\mu m$.

In some embodiments, the flakes have a particle size of 50-500 nanometers (nm).

In some embodiments, the jute carbon has 90-96 wt. % carbon, 2-5 wt. % oxygen, 0.05-0.2 wt. % magnesium, and 0.05-0.2 wt. % calcium, based on the total weight of the carbon, oxygen, magnesium, and calcium in the jute carbon.

In some embodiments, the jute carbon is at least 60% amorphous.

In some embodiments, at least a portion of the jute carbon includes graphitic carbon.

In some embodiments, the anticorrosive nanocomposite includes 0.1-10 wt. % jute carbon and 90-99.9 wt. % cured epoxy, based on the total weight of the jute carbon, and the cured epoxy.

In some embodiments, the cured epoxy is a blend of at least one epoxy resin and at least one hardener. The blend includes 80-95 wt. % epoxy resin and 5-20 wt. % hardener, based on the total weight of the epoxy resin and the hardener.

In some embodiments, the epoxy resin is at least one selected from the group consisting of bisphenol A and bisphenol F.

In some embodiments, the hardener is at least one selected from the group consisting of a phenol, an aromatic amine, an aliphatic amine, and a thiol.

In some embodiments, a saltwater corrosion resistant surface is described. A layer of the anticorrosive nanocomposite is at least partially coated on the surface.

In some embodiments, the layer has a thickness of 10 to 500 $\mu m$.

In some embodiments, the surface is made from at least one material selected from the group consisting of iron, steel, copper, aluminum, nickel, zinc, cobalt, lead, chromium, tantalum, titanium, zirconium, silver, and niobium.

In some embodiments, the saltwater corrosion resistant surface has an open circuit potential (OCP) value of −0.2-0.0 volts (V) against a saturated calomel electrode (SCE).

In some embodiments, the saltwater corrosion resistant surface has an impedance modulus ($|Z|$) of $1 \times 10^8$ to $1 \times 10^{10}$ ohm square centimeter ($\Omega cm^2$) after at least 60 days in a solution of 1-10% salt dissolved in water.

In some embodiments, the corrosion rate of the saltwater corrosion resistant surface, is $0.1 \times 10^{-3}$ to $1 \times 10^{-3}$ millimeters per year (mmpy).

In some embodiments, the corrosion rate is at least 13 times lower than that of a surface coated with the cured epoxy without the jute carbon.

In some embodiments, a method of preparing the jute carbon is described. The method includes cutting raw jute sticks into pieces less than 2 centimeters (cm) in size to form jute pieces. The method further includes washing the jute pieces with water and heating to a temperature of at least 110 degrees Celsius (° C.) for 24 hours to form clean jute pieces. The method further includes grinding the clean jute pieces into a powder and pyrolyzing at a temperature of 700-1,000° C. under an inert atmosphere for at least 5 hours, to form a pyrolyzed jute carbon. The method further includes grinding the pyrolyzed jute carbon into a powder to form the jute carbon.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4G is a FESEM image of the grinded jute carbon after ball milling for 10 hours at a magnification of 2 μm scale bar, according to certain embodiments;

FIG. 4H is a FESEM image of the grinded jute carbon after ball milling for 10 hours at a magnification of 1 μm scale bar, according to certain embodiments;

FIG. 4I is a FESEM image of the grinded jute carbon after ball milling for 10 hours at a magnification of 500 nm scale bar, according to certain embodiments;

FIG. 4J is a FESEM image of the grinded jute carbon after ball milling for 15 hours at a magnification of 2 μm scale bar, according to certain embodiments;

FIG. 4K is a FESEM image of the grinded jute carbon after ball milling for 15 hours at a magnification of 1 μm scale bar, according to certain embodiments;

FIG. 4L is a FESEM image of the grinded jute carbon after ball milling for 15 hours at a magnification of 500 nm scale bar, according to certain embodiments;

DETAILED DESCRIPTION

Figure 1:
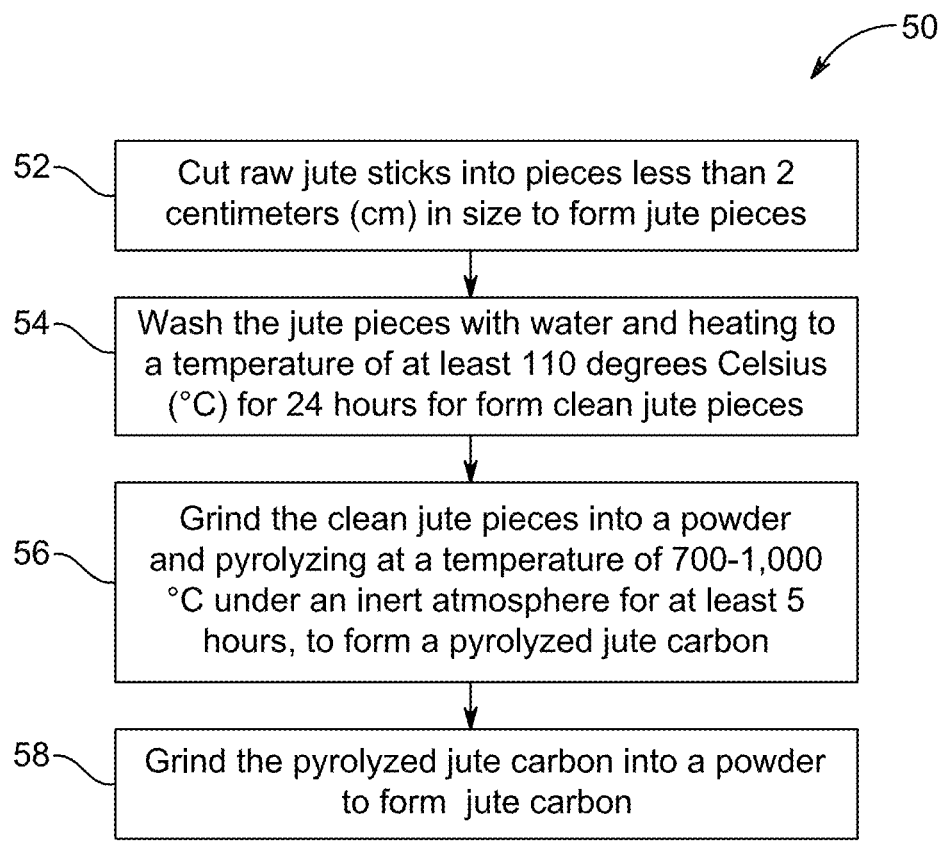
FIG. 1 is a schematic flowchart of a method of preparing jute carbon for an anticorrosive nanocomposite, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present disclosure are directed towards an anticorrosive nanocomposite, otherwise referred to as the 'nanocomposite'. The nanocomposite can be applied on surfaces or substrates, such as steel, carbon steel, stainless steel, and any other metallic substrate used or known to be susceptible to corrosion, particularly in marine environments. Experimental results with the nanocomposite on the surfaces or substrates demonstrated a significant increase in anticorrosion behavior. In addition, the nanocomposite exhibits extended service life at low costs, thereby circumventing the drawbacks, such as high manufacturing cost and low corrosion resistance properties of the prior art.

The anticorrosive nanocomposite includes a cured epoxy. In some embodiments, the cured epoxy is a blend of at least one epoxy resin and at least one hardener. The blend includes 80-95 wt. % the epoxy resin and 5-20 wt. % the hardener, based on the total weight of the epoxy resin and the hardener. In some embodiments, the blend includes 85-90 wt. % epoxy resin and 10-15 wt. % hardener, based on the total weight of the epoxy resin and the hardener. In some embodiments, the epoxy resin is at least one selected from the group consisting of bisphenol A and bisphenol F. In some embodiments, the bisphenols may be replaced by or optionally used in combination with polyurethane, phenolic resins, alkyd resins, aminoplast resins, vinyl alkyds, silicone alkyds, uralkyds, urethane resins, unsaturated polyester resins, silicones, vinyl acetates, vinyl acrylics, acrylic resins, vinyl resins, polyimides, unsaturated olefin resins, fluorinated olefin resins, or a combination thereof. In some embodiments, the hardener is at least one selected from the group consisting of a phenol, an aromatic amine, an aliphatic amine, and a thiol. In a preferred embodiment, the epoxy resin is bisphenol A diglycidyl ether and the hardener is polyoxyalkylene amine.

The anticorrosive nanocomposite further includes jute carbon. In some embodiments, the jute carbon may be obtained from jute stick, an agricultural waste material. The jute stick may be generated as an agricultural byproduct from jute plants during the jute plant extraction. In general, but is not meant to be limiting, the jute stick includes about 35-45 wt. % cellulose, 15-25 wt. % hemicellulose, and 20-30 wt. % lignin. Furthermore, the jute stick includes high amounts of carbon (about 40-50 wt. %), oxygen (about 40-50 wt. %), and trace amounts of ash. Hence, the jute stick may be considered as an efficient and inexpensive source of pure carbon. In some embodiments, the process of converting jute stick to jute carbon is included. In some embodiments, the method may include, but is not limited to, pyrolysis of jute fiber and/or jute waste. As used herein, the term 'pyrolysis' refers to a process in which the biomass is heated at high temperature and held for a specified time at that temperature in an inert atmosphere to avoid combustion of a material being pyrolyzed.

Referring to FIG. 1, a schematic flow diagram of a method 50 of preparing the jute carbon is illustrated. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes cutting raw jute sticks into pieces less than 2 cm, preferably 0.01-2 cm, 0.05-1.5 cm, 0.1-1 cm, or approximately 0.5 cm in size to form jute pieces. The jute sticks may be cut by one or more simple tools such as knives.

At step 54, the method 50 includes washing the jute pieces with water and heating to a temperature of at least 110° C., preferably 110-200° C., 120-190° C., 130-180° C., 140-170° C., or 150-160° C. for 24 hours to form clean jute pieces. In some embodiments, the jute pieces may be washed with de-ionized water to remove dust or foreign matter. Furthermore, the jute pieces are heated to remove moisture.

At step 56, the method 50 includes grinding the clean jute pieces into a powder and pyrolyzing at a temperature of 700-1,000° C., preferably 750-950° C., or 800-900° C. under an inert atmosphere for at least 5 hours, preferably 5-10 hours, or 6-8 hours, to form a pyrolyzed jute carbon. In some embodiments, the cleaned and dried jute pieces may be ground to powder and pyrolyzed at 850° C. in a tubular furnace under nitrogen for about 5 hours at a heating rate of 10° C./minute and a cooling rate of 5° C./minute.

At step 58, the method 50 includes further grinding the pyrolyzed jute carbon into a powder to form the jute carbon. In some embodiment, the pyrolyzed jute carbon may be ground using a mortar and pestle.

In some embodiments, the jute carbon is further pulverized into smaller pieces using high energy ball milling. The term 'high energy ball milling' refers to a technique of mechanically grinding a material to produce fine and uniform-sized nanoparticles by high energy collisions of balls.

In some embodiments, the jute carbon is in the form of flakes. In an embodiment, the flakes are less than 500 nm thick, preferably 1-500 nm, 20-450 nm, 40-200 nm, 60-150 nm, 80-120 nm, or approximately 100 nm thick. In some embodiments, the jute carbon is in the form of flakes having a rectangular flake structure. In an embodiment, the rectangular flakes have a flat top and bottom surface that are coplanar and a thickness and width that are less than the length of the flake. In an embodiment, the flakes have an irregular shape. In some embodiments, the irregular flakes have a flat top and bottom surface that are coplanar. In some embodiments, the flakes may include shapes which are not limited to, circular, polygonal, crescent, octagonal, hexagonal. In some embodiments, the particle size is defined by the longest dimension of the jute carbon flakes. In some embodiments, the flakes have a particle size of 0.05-15 μm, preferably 0.1-10 μm, or 1-5 μm. In some embodiments, the flakes have a particle size of 10-15 μm. In some embodiments, the flakes have a particle size of 50-500 nm. In some embodiments, the particle size of the flakes may lie in a range of about 100 nm to about 400 nm. In some embodiments, the size and shape of the flakes vary based on the duration of the high energy ball milling.

In an embodiment, the jute carbon is subjected to high energy ball milling for 1-15 hours. In an embodiment, the high energy ball milling is carried out at an rpm of 1,000-5,000, preferably 2,000-4,000 rpm, or approximately 3,000 rpm. In an embodiment, the high energy ball milling includes a liquid such as a dispersion medium. In an embodiment, the liquid is selected from the group consisting of water, methanol, and ethanol. In an embodiment, zirconia balls are used in the high energy ball milling. In an embodiment, any material known in the art strong enough to withstand the ball milling conditions may be used. In an embodiment, the zirconia balls are 200-1,000 μm in diameter, preferably 300-800, or 500-600 μm. In an embodiment, the mass ratio of balls to jute carbon is 1-20:1.

In an embodiment, jute carbon made by the method 50 without high energy ball milling has a flake size of 10-15 μm, preferably 11-14 μm, or 12-13 μm. In an embodiment, jute carbon made by the method 50 subjected to 5 hours of high energy ball milling has a flake size variation of 1-10%>2 μm, 40-60% 1-2 μm, 20-30% 1-0.5 μm, and 9%<500 nm. In an embodiment, jute carbon made by the method 50 subjected to 10 hours of high energy ball milling has a flake size variation of 40-50% 1-0.5 μm, and 30-50% 300-500 nm, and 5-10% 100-200 nm. In an embodiment, jute carbon made by the method 50 subjected to 15 hours of high energy ball milling has a flake size variation of 1-10%>500 nm, and 40-60% 300-500 nm, and 100-200 nm. In an embodiment, after 15 hours of high energy ball milling the jute carbon flakes are less than 500 nm in size. In an embodiment, jute carbon made by the method 50 subjected to 15 hours of high energy ball milling has at least 1% of flakes less than 100 nm in size, preferably 5%, 10%, 20%, 30%, 40%, 50%, 60%, 70%, 80%, 90%, or 100%.

In some embodiments, the jute carbon has 90-96 wt. % carbon, 2-5 wt. % oxygen, 0.05-0.2 wt. % magnesium, and 0.05-0.2 wt. % calcium, based on the total weight of carbon, oxygen, magnesium, and calcium in the jute carbon. In some embodiments, the jute carbon has 92-94 wt. % carbon, 3-4.5 wt. % oxygen, 0.08-0.1 wt. % magnesium, and 0.08-0.1 wt. % calcium, based on the total weight of the carbon, oxygen, magnesium, and calcium in the jute carbon. In some embodiments, the jute carbon has trace elements such as but not limited to potassium, sodium, aluminum, zinc, copper, sulfur, chlorine, bromine, iodine, and phosphorus.

In some embodiments, at least a portion of the jute carbon includes graphitic carbon. In some embodiments, the jute carbon is 1%, 5%, 10%, 20%, 30%, 40%, 50%, 60%, 70%, 80%, 90%, or 100% graphitic carbon. In some embodiments, at least a portion of the jute carbon has a d-spacing of 3.1-3.5 Å, preferably 3.2-3.4 Å, or approximately 3.3 Å. In some embodiments, the XRD spectrum of the jute carbon displays a (002) peak at 19-27°, preferably 22-25°, or 23-24°, a (101) peak at 42-46°, preferably 43-45°, or approximately 44°, a (102) peak at 48-52°, preferably 49-51°, or approximately 50°, and a (103) peak at 57-61°, preferably 58-60°, or approximately 59°. In some embodiments, the jute carbon is at least 60% amorphous, preferably 70%, 80%, or 90%. In some embodiments, the jute carbon is crystalline. In an embodiment, increased duration of high energy ball milling of the jute carbon results in higher crystallinity.

In an embodiment, particles of the jute carbon are dispersed in the cured epoxy. In some embodiments, the anticorrosive nanocomposite includes 0.1-10 wt. % jute carbon, preferably 0.5-9 wt. %, 1-8 wt. %, 2-7 wt. %, 3-6 wt. %, or 4-5 wt. %, and 90-99.9 wt. % cured epoxy, preferably 91-99.5 wt. %, 92-99 wt. %, 93-98 wt. %, 94-97 wt. %, or 95-96 wt. %, based on the total weight of jute carbon, and the cured epoxy. In some embodiments, the anticorrosive nanocomposite includes 5-8 wt. % jute carbon and 93-95 wt. % cured epoxy, based on the total weight of the jute carbon, and the cured epoxy.

In some embodiments, the cured epoxy acts as a binding agent. Hereinafter, binding agent refers to materials that convert to adherent membranes on a metal surface. The binding agent makes the coating capable of being directly applied to a metal surface.

The present disclosure also provides a saltwater corrosion resistant surface, referred to as the surface. In some embodiments, the surface is made from at least one material selected from the group consisting of iron, steel, copper, aluminum, nickel, zinc, cobalt, lead, chromium, tantalum, titanium, zirconium, silver, and niobium. In some embodiments, a layer of the anticorrosive nanocomposite (or the coating) is at least partially coated, at least 50%, preferably 60%, 70%, 80%, or 90% on the surface. In some embodiments, a layer of the anticorrosive nanocomposite is completely coated on the surface. Components of the nanocomposite may even provide corrosion protection in the presence of gaps in the anticorrosive nanocomposite on the surface. In some embodiments, the nanocomposite may be applied over exposed surfaces of metal substrates. In some embodiments, the nanocomposite may be applied as an interlayer between a pair of exposed metal surfaces.

In some embodiments, the layer has a thickness of 10 to 500 μm, preferably 50-450 μm, 100-400 μm, 150-350 μm, 200-300 μm, or approximately 250 μm. In some embodiments, the thickness of the layer may be in a range of about 50 μm to about 450 μm. In some embodiments, the surface is more hydrophobic than the same surface not coated with the nanocomposite. The hydrophobic nature prevents the surface from water exposure. In some embodiments, the layer may be coated on the surface with an electrospray deposition. In some embodiments, the layer may be coated on the surface by one or more methods, including, but not limited to, coater, spray coater, or painting using a brush.

As used herein, the open circuit potential (OCP) value refers to the potential value that exists in an open circuit against a saturated calomel electrode (SCE). In some embodiments, the saltwater corrosion resistant surface has an OCP value of −0.2 to 0.0 volts (V) vs SCE, preferably −0.15 to −0.05 V vs SCE, or approximately −0.1 V vs SCE. In some embodiments, the OCP value may be in a range of about −0.25 V vs SCE to about −0.1 V vs SCE. In some embodiments, the saltwater corrosion resistant surface has an impedance modulus ($|Z|$) of $1 \times 10^8$ to $1 \times 10^{10}$, preferably $1 \times 10^{8.5}$, or $1 \times 10^9$ ohm square centimeter ($\Omega cm^2$) after at least 60 days, preferably 100 days or 1,000 days in a solution of 1-10% salt dissolved in water. As used herein, the impedance modulus refers to the ratio of the voltage amplitude to the current amplitude.

In an embodiment, the corrosion rate of the saltwater corrosion resistant surface, is $0.1 \times 10^{-3}$ to $1 \times 10^{-3}$ millimeters per year (mmpy). As used herein, the corrosion rate refers to the speed at which any metal in a specific environment deteriorates. In some embodiments, the corrosion rate is at least 13 times lower, preferably 13-20, or 15 times lower than a surface coated with the cured epoxy without the jute carbon. In some embodiments, the saltwater corrosion resistance is maintained for at least 60 days, preferably 100 days, 1,000, or 10,000 days in a solution of 1-10% salt dissolved in water.

The present disclosure also provides a method of inhibiting corrosion on a surface in a saltwater environment. The method includes at least partially coating at least one layer of the nanocomposite onto the surface. In some embodiments, the surface may be completely coated with one layer of the coating. In some embodiments, the surface is coated with 2-10, preferably 3-8, or approximately 5 layers of the coating.

EXAMPLES

The following examples describe and demonstrate exemplary embodiments of the anticorrosive nanocomposite described herein. The examples are provided solely for the purpose of illustration and are not to be construed as limitations of the present disclosure, as many variations thereof are possible without departing from the spirit and scope of the present disclosure.

Materials and Chemicals

Jute sticks, Bisphenol A (diglycidyl ether based-epoxy) and hardener (polyoxyalkylene amine based), mild steel (MS) plate of 2 millimeters (mm) thickness, 2-butanone solvent, acetone, ethanol, epoxy resin were used.

Example 1: Materials and Characterization Experiments

Synthesis of submicron-/nano-jute carbon involved stages such as carbonization (pyrolysis) and ball milling. Raw jute sticks were chopped into small pieces, cleaned with the de-ionized water to remove any dust or foreign matter and subsequently heated at 110° C. for 24 hours for the removal of moisture. The cleaned and dried jute sticks were then ground to powder and pyrolyzed at 850° C. in a tubular furnace under nitrogen atmosphere for about 5 hours at a heating rate of 10° C./min and a cooling rate of 5° C./min. The quantity of carbon obtained after pyrolysis was around 20% of an initial weight of jute stick powder. The pyrolyzed jute carbon was further ground to a fine powder using a kitchen grinder for 5 minutes. The obtained carbon upon grinding is interchangeably referred to as the grinded jute carbon.

The fine grinded jute carbon was subjected to high energy ball milling under wet conditions at 3000 rotations per minute (rpm) speed to obtain the submicron-/nano-jute carbon. Ball milling was carried for 15 hours while measuring the size at different time intervals of 5, 10 and 15 hours using Field Emission Scanning Electron Microscopes (FE-SEM). Zirconia ($ZrO_2$) balls of 600-micron diameter were used at 1:20 (mass to mass) ratio of the carbon to the zircon balls. 100 ml ethanol (which can be attributed to the wet conditions) was added to a mixture formed.

Preparation of Submicron-/Nano-Jute Carbon/Composite Epoxy Coating

Figure 2:
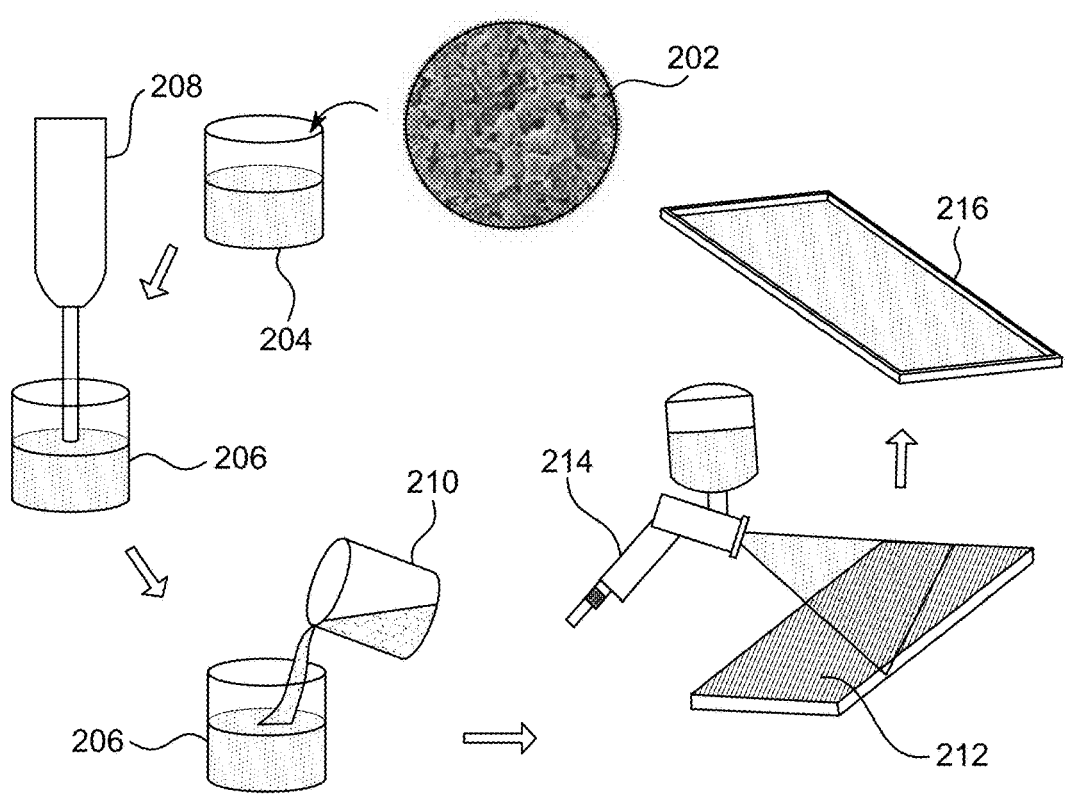
FIG. 2 is a schematic diagram showing preparation and application of the anticorrosive nanocomposite on a mild steel (MS) substrate, according to certain embodiments.

The procedure for the preparation and application of the composite epoxy coating on the MS substrate is depicted in a schematic diagram shown in FIG. 2. Submicron-/nano-jute carbon 202 (i.e. carbon obtained after 15 hours ball milling of the grinded carbon) was added to an epoxy resin 204 at different combinations, i. e., 0.25, 0.75, and 1.0 wt. % to develop corresponding mixtures or composite epoxy coatings (EC 0.25%, EC 0.75%, and EC 1.0%, collectively referred to as the 'samples/coatings' or individually referred to as the 'sample/coating', unless specified). However, neat epoxy coating was used as a reference. Viscosity of the epoxy resin 204 was decreased using 2-butanone solvent at 10 wt. % of the epoxy resin 204. A mixture 206 was sonicated using an ultrasonic probe sonicator 208 (performs dispersion of nanomaterials) for about 10 minutes at an amplitude of 60% and a temperature of 45° C. to achieve a uniform distribution of carbon particles in the epoxy resin 204. A hardener 210 was added to the mixture 206 at 1:1 ratio (mass) and mixed uniformly for about 2-3 minutes. The composite epoxy coating was then applied on a MS substrate 212 (composition: C=0.27%, Fe=98.0%, Mn=0.68%, Si=0.22%, Cu=0.08%, P=0.02%, Al=0.02%) using a spray gun 214 and cured for 72 hours at room temperature (RT). The MS surface was sand blasted and cleaned with the acetone prior to the application of composite epoxy coating 216. The coating thickness was measured using an EleckroPhysik QuintSonic ultrasonic coating thickness measuring device. An average thickness of the coating was in a range of 110-140 µm.

The ground and ball-milled jute carbon particles were characterized to assess corresponding morphology using FE-SEM, Lyra-3, Tescan and transmission electron microscope (TEM) (JEM-2011; JEOL). Elemental composition of the jute carbon particles was determined using energy dispersive X-Ray spectrometer (EDS, X-MaxN silicon drift detector, Oxford Instruments, UK). A voltage of 20 kilovolts (kV) was adopted for all the SEM and EDS analyses. Crystal structural information was determined using X-ray diffraction (XRD, MiniFlex, Rigaku). A diffractometer was operated at 0.15416 nm wavelength, 10 milliamperes (mA) current, and 30 kV voltage. A Raman (iHR320 imaging Spectrometer packaged with charge-coupled device (CCD) detector, HORIBA) equipped with a 300 milliwatts (mW) green laser was used to record the Raman spectra of the developed carbon with an excitation wavelength of 532 nm at RT. A micro-focusing X-ray monochromator XPS (ESCALAB 250XiXPS Microprobe, Thermo Scientific, USA) was used for the XPS analysis.

Figure 3:
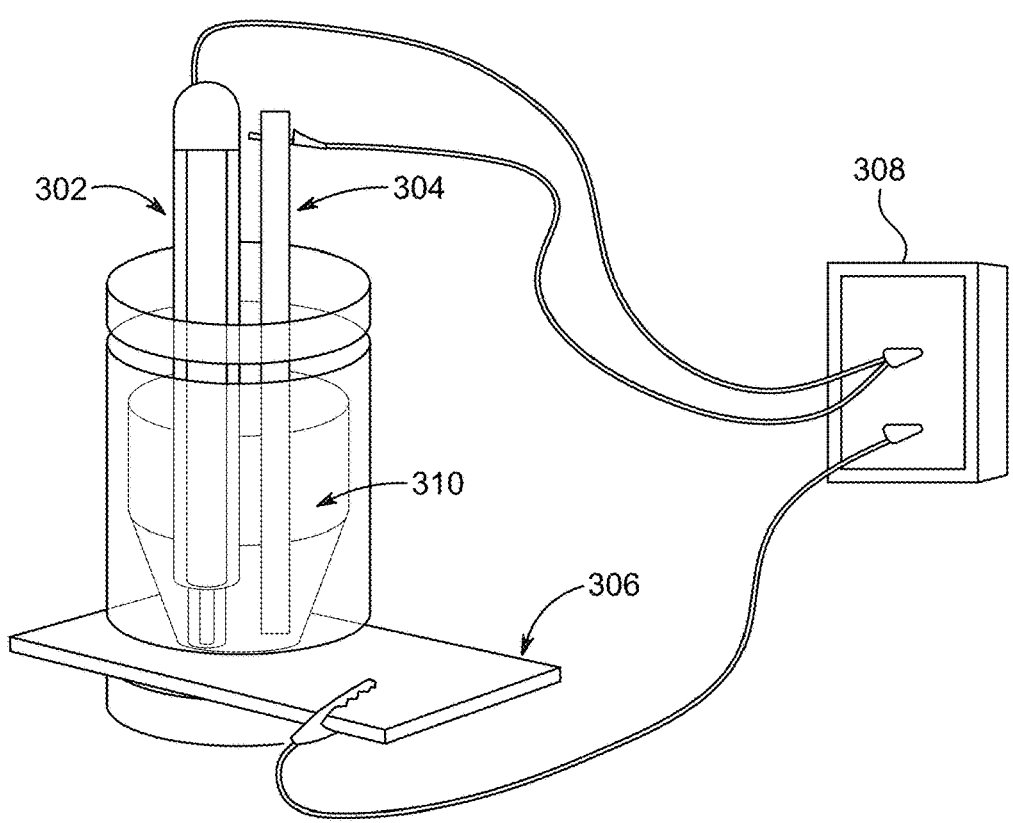
FIG. 3 is an exemplary electrochemical cell used for corrosion evaluation of coated specimens in 3.5% NaCl solution, according to certain embodiments.

Corrosion resistance performance of the submicron-/nano-jute carbon incorporated composite epoxy coatings was evaluated using electrochemical impedance spectroscopy (EIS), potentiodynamic polarization (PDP) and salt spray techniques. The EIS and PDP measurements were conducted using a three-electrode electrochemical cell shown in FIG. 3. A saturated calomel electrode (SCE) was used as a reference electrode 302, a graphite rod was used as a counter electrode 304 and a coated MS steel specimen served as a working electrode 306. The EIS measurements were carried out at an alternating current (AC) voltage of 10 millivolts (mV) amplitude versus OCP over a frequency range of 1,00,000 to 0.01 hertz (Hz) using Gamry 3000 Potentiostat/Galvanostat 308. The measurements were recorded on a sample area of 2.57 $cm^2$ exposed to 3.5% NaCl electrolyte 310. An Echem analyst software was used for fitting the obtained EIS data. The EIS measurements were conducted on three specimens and the average values were reported. The corrosion rate of MS specimens coated with the neat and composite epoxy coatings was determined using the PDP technique. The PDP measurements were conducted on coated specimens exposed to 3.5% NaCl solution for about 60 days, polarized from −0.9 V to +0.9 V at a scan rate of 0.25 mV/s using Gamry Potentiostat/

Galvanostat. The electrode system was similar to that used for the EIS measurements. For repeatability, the test was performed on the samples, and the mean values were reported.

The salt spray technique, a physical method of the corrosion evaluation was also used. The salt spray performance was conducted on coated MS steel specimens measuring 10×15×0.2 cm, coated with the neat/composite epoxy coatings. The test specimens were exposed in a salt spray chamber for about 1000 hours as per the procedure outlined in ASTM B117, however the application of scribes on specimens and corresponding corrosion performance was assessed as per the procedure outlined in ASTM D1654. After salt spray exposure, the exposed specimens were removed, cleaned, and photographed for visual evaluation. Finally, a qualitative performance rating was provided to each specimen as per the criteria provided in ASTM D 1654.

Example 2: Characterization of Submicron-/Nano-Jute Carbon

Figure 4C:
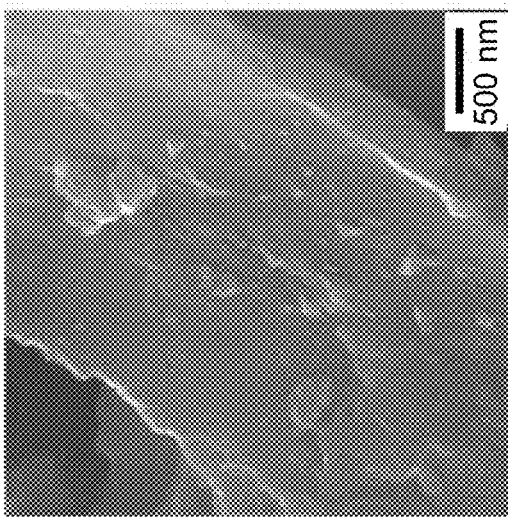
FIG. 4C is a FESEM image of the grinded jute carbon at a magnification of 500 nanometres (nm) scale bar, according to certain embodiments.
Figure 4F:
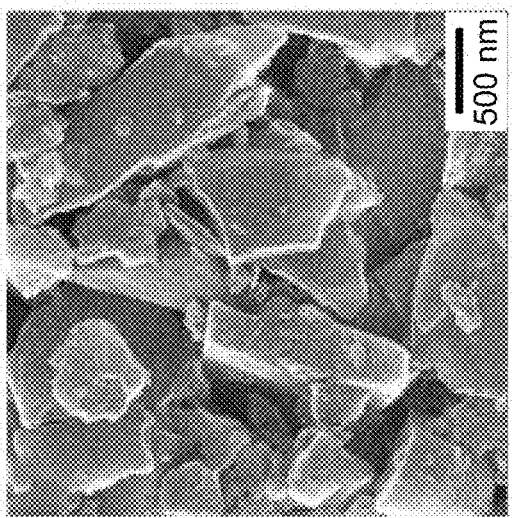
FIG. 4F is a FESEM image of the grinded jute carbon after ball milling for 5 hours at a magnification of 500 nm scale bar, according to certain embodiments.
Figure 4B:
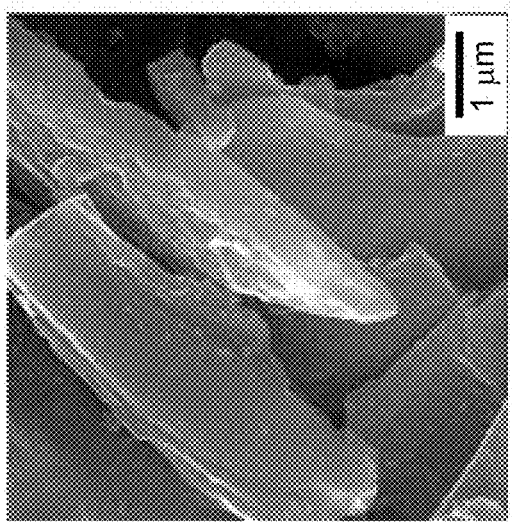
FIG. 4B is a FESEM image of the grinded jute carbon at a magnification of 1 μm scale bar, according to certain embodiments.
Figure 4E:
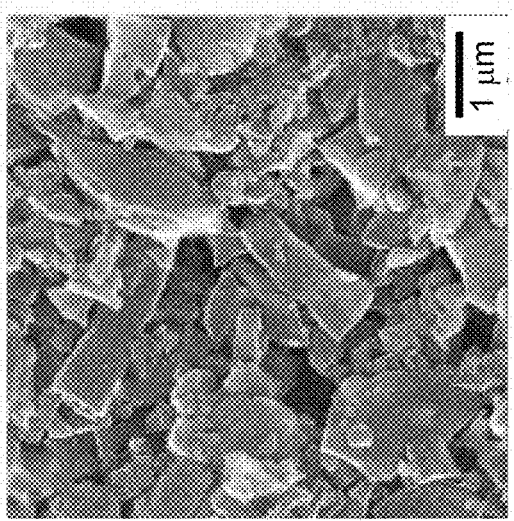
FIG. 4E is a FESEM image of the grinded jute carbon after ball milling for 5 hours at a magnification of 11 μm scale bar, according to certain embodiments.
Figure 4A:
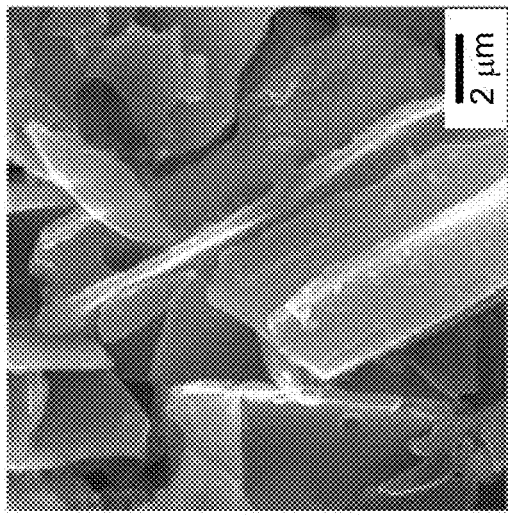
FIG. 4A is a Field Emission Scanning Electron Microscope (FESEM) image of grinded jute carbon at a magnification of 2 micrometres (μm) scale bar, according to certain embodiments.
Figure 4D:
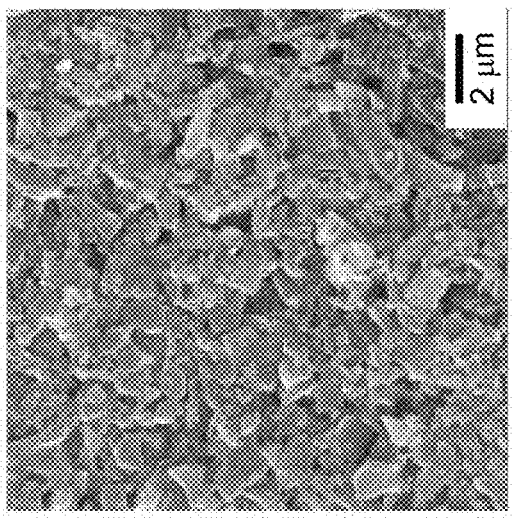
FIG. 4D is a FESEM image of the grinded jute carbon after ball milling for 5 hours at a magnification of 2 μm scale bar, according to certain embodiments.

The morphology of the grinded jute carbon and the ball-milled jute carbon was assessed using the FESEM and is shown in FIGS. 4A-4L. FIGS. 4A-4C represent the FESEM images of the grinded jute carbon at magnifications of 2 μm, 1 μm, and 500 nm scale bar, respectively. The carbon has a flaky/rectangular sheet type of structure with a typical particle size of 10-15 μm. FIGS. 4D-4F represent the FESEM images of the grinded jute carbon after ball milling for hours at different magnifications of 2 μm, 1 μm, and 500 nm scale bar, respectively. The particle size has decreased significantly which can be attributed to the high energy ball milling. A typical measurement of the particle size from the FESEM image indicates a wide range of size variations as follows: 5%>2 μm, 60% in the range of 1-2 μm, 26% in the range of 1-0.5 μm, 9%<500 nm. FIGS. 4G-4I represent the FESEM images of the grinded jute carbon after ball milling for 10 hours at magnifications of 2 μm, 1 μm, and 500 nm scale bar, respectively. A typical measurement of the particle size from the FESEM images indicates a wide range of size variations, 45% in the range of 1-0.5 μm, 40% in the range of 500-300 nm, and 15% in the range of 200-100 nm. FIGS. 4J-4L represent the FESEM images of the grinded jute carbon after ball milling for 15 hours at magnifications of 2 μm, 1 μm, and 500 nm scale bar, respectively. A typical measurement of the particle size from the FESEM images indicates a wide range of size variations, 6%>500 nm, 50% in the range of 500-300 nm, 43% in the range of 200-100 nm. The size of the carbon particles significantly decreased with the duration of ball milling. As the size of the developed carbon after 15 hours of ball milling is varying from 100-500 nm, the developed carbon can be classified as the submicron-/nano-jute carbon.

Figure 5:
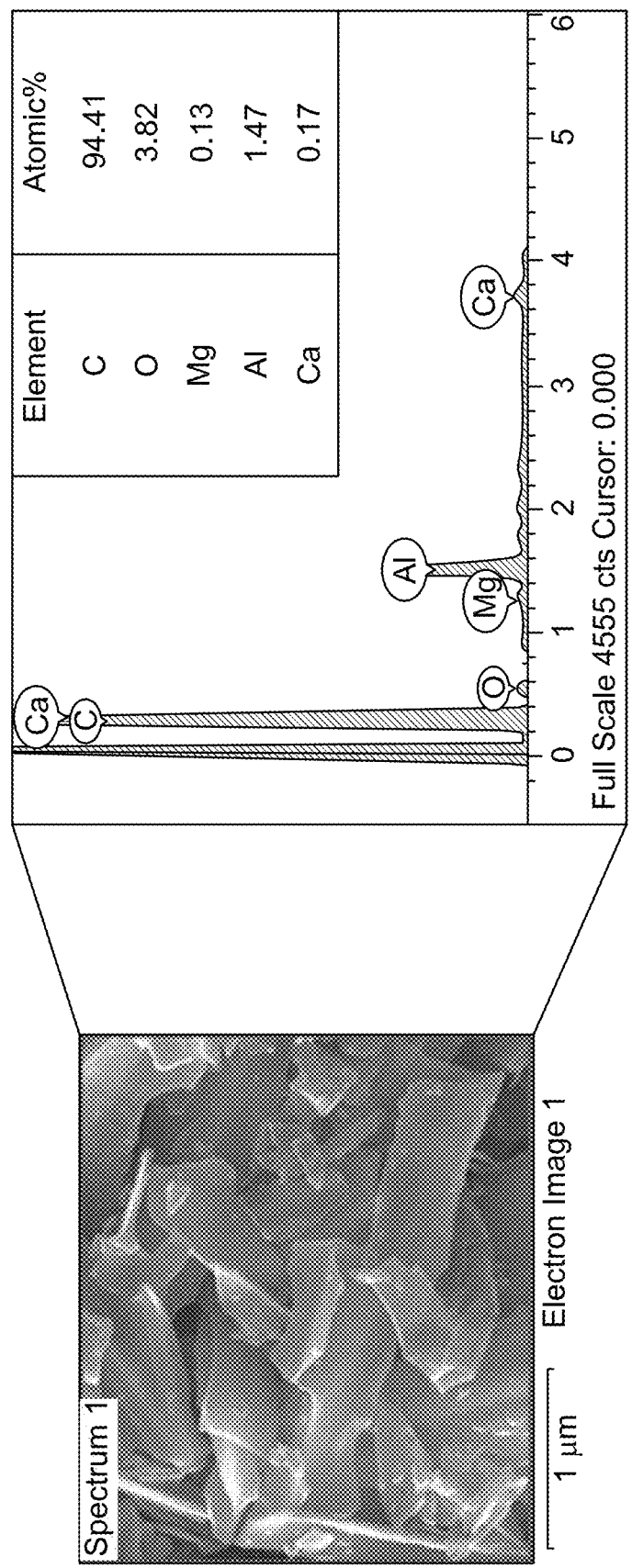
FIG. 5 is an Energy-dispersive X-ray spectroscopy (EDS) spectrum and elemental composition of the grinded jute carbon, according to certain embodiments.

FIG. 5 shows the EDS spectrum and elemental composition of the grinded jute carbon. Carbon and oxygen are the major elements although traces of magnesium and calcium were also detected. Aluminium in the EDS is from the aluminium substrate used as a sample holder.

Figure 6A:
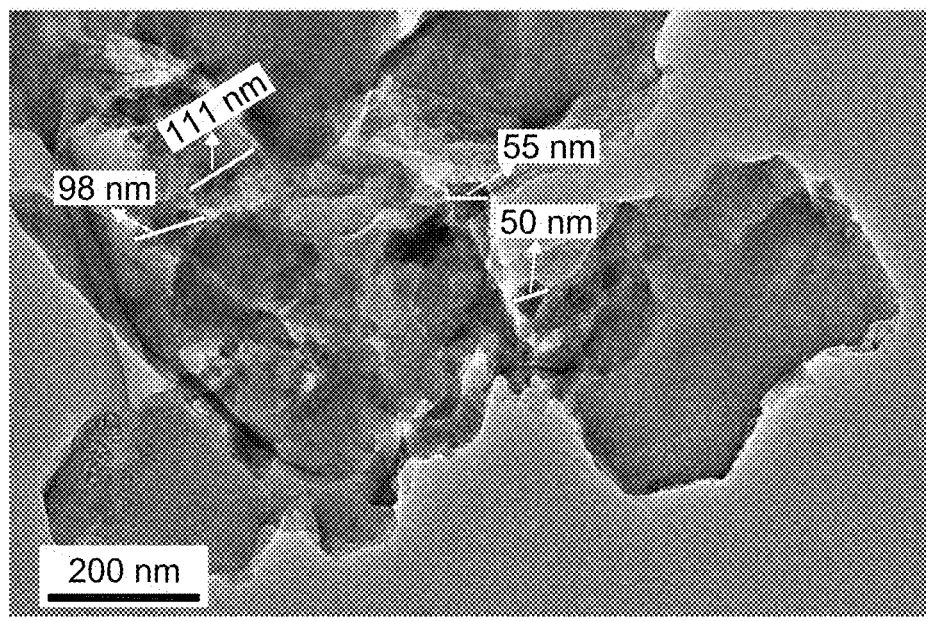
FIG. 6A is a Transmission Electron Microscopic (TEM) image of submicron-/nano-jute carbon, according to certain embodiments.
Figure 6B:
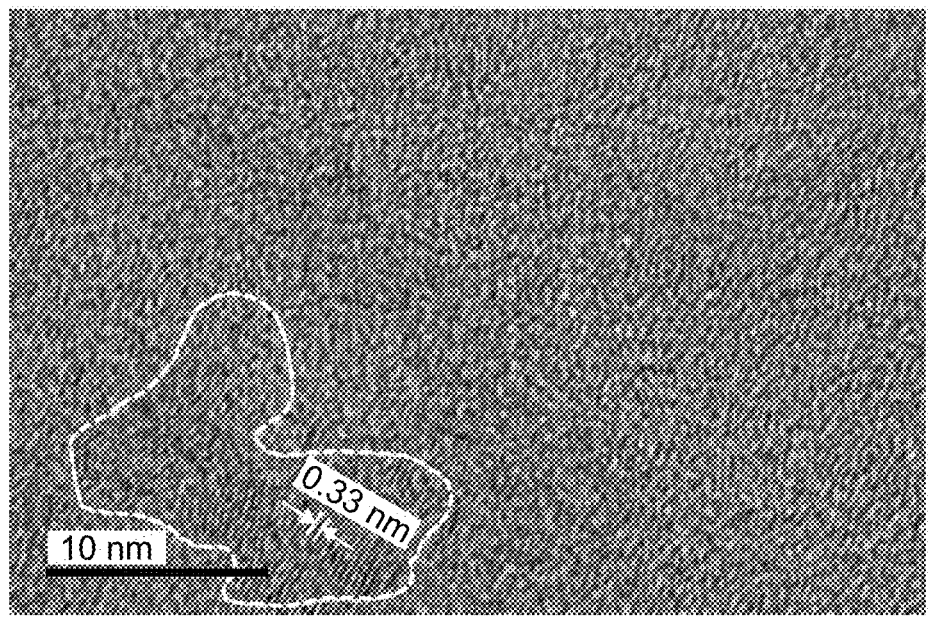
FIG. 6B is a TEM image of the submicron-/nano-jute carbon, according to certain embodiments.

The TEM analysis was performed on the submicron-/nano-jute carbon to obtain information about a grain boundary distribution, lattice distortion of grains, and surface morphology of fine grains. FIG. 6A shows the TEM image representing the grain size and boundary distribution of the submicron-/nano-jute carbon. The individual grain boundaries of different particles can be clearly seen in FIG. 6A. The grain boundary distribution also confirms the presence of several particles of <100 nm, as indicated (dotted lines) at a few selected areas. A crystal lattice arrangement, lattice fringes and d spacing of the submicron-/nano-jute carbon was observed using high resolution transmission electron microscopy (HRTEM), as shown in FIG. 6B. The HRTEM lattice distribution shows that the submicron-/nano-jute carbon is mostly amorphous in nature since few lattice fringes were observed, as indicated in the highlighted area. The width of the lattice fringe or the d spacing of the submicron-/nano-jute carbon is around 3.3 angstrom (A) and matches with the lattice spacing of (002) crystal plane, which correlates with the XRD data.

Figure 7:
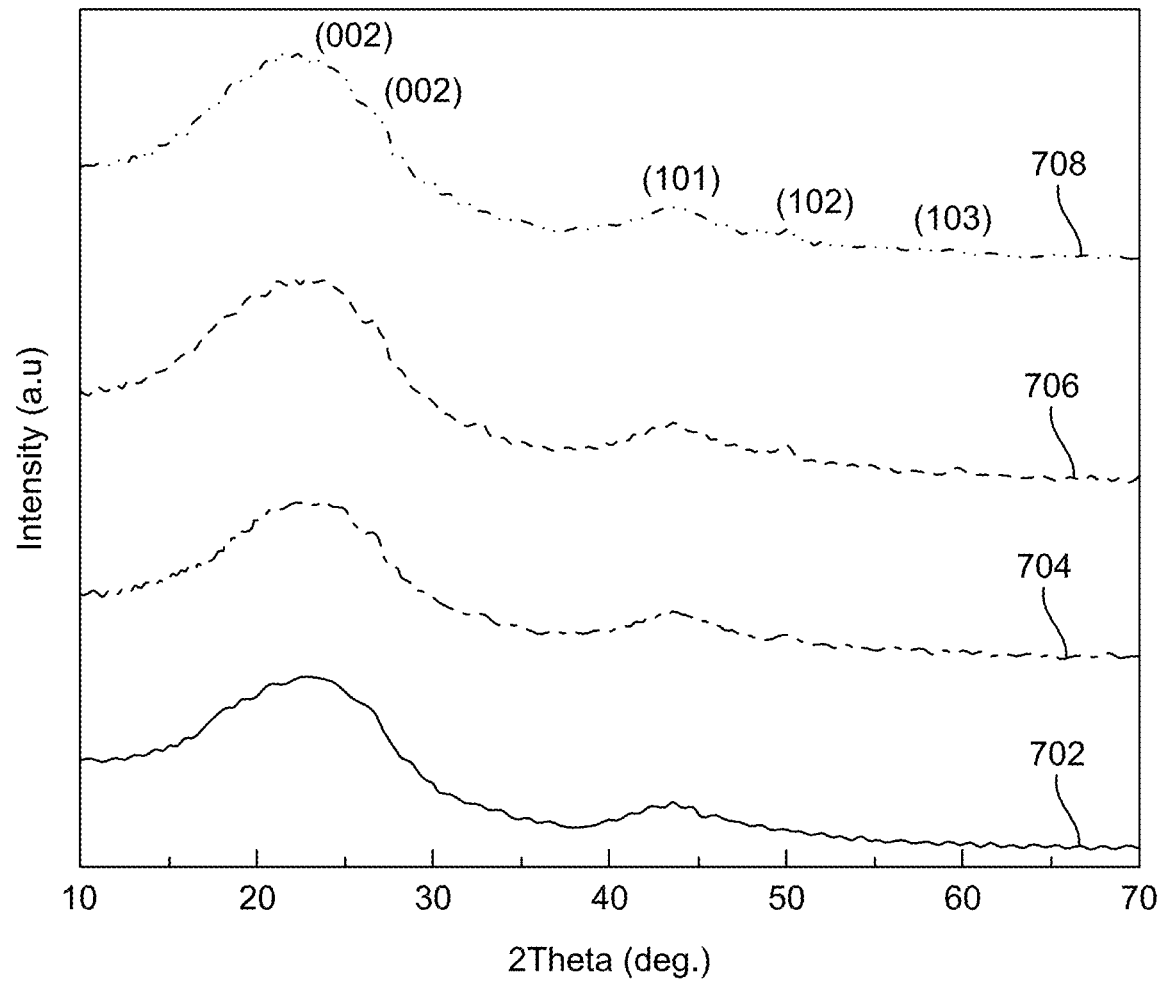
FIG. 7 are X-Ray Diffraction (XRD) patterns of grinded and ball-milled jute carbon, according to certain embodiments.

The XRD patterns of the grinded and ball-milled jute carbon are shown in FIG. 7. A pattern 702 shows the XRD pattern of the grinded jute carbon. Diffraction peaks in the range of 19 to 27°, 44°, 50°, 59° 2θ correspond to (002), (101), (102), (103) planes of carbon (JSCPDS card No. 01-077-7164). However, the occurrence of peaks at ~26.5° 2θ, correspond to (002) planes of graphite (JSCPDS card No. 00-056-0159). Patterns 704, 706, 708 show the XRD patterns of the carbon obtained after ball milling of the grinded jute carbon for 5, 10 and 15 hours, respectively. Peaks formed in the ball-milled jute carbon are similar to the peaks noted in the grinded jute carbon. FIG. 7 confirms that the grinded jute carbon and the ball-milled jute carbon are amorphous in nature.

Figure 8A:
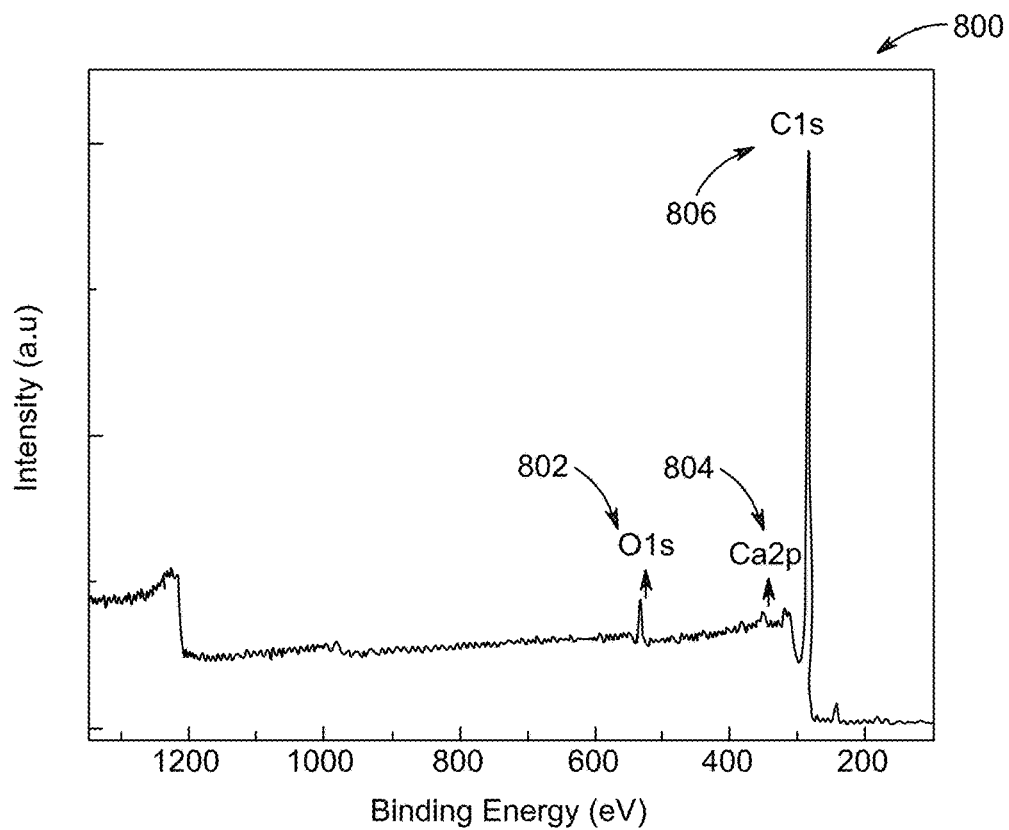
FIG. 8A is a graph depicting an X-ray photoelectron spectroscopy (XPS) spectrum of the submicron-/nano-jute carbon, according to certain embodiments.

FIG. 8A is a graph depicting XPS spectrum 800 of the submicron-/nano-jute carbon. FIG. 8A shows that the XPS spectrum 800 includes peaks 802, 804, 806 corresponding to oxygen, calcium and carbon, respectively. FIG. 8A indicates the presence of carbon and oxygen as major constituents in the developed submicron-/nano-jute carbon in addition to minor quantities of the calcium.

Figure 8B:
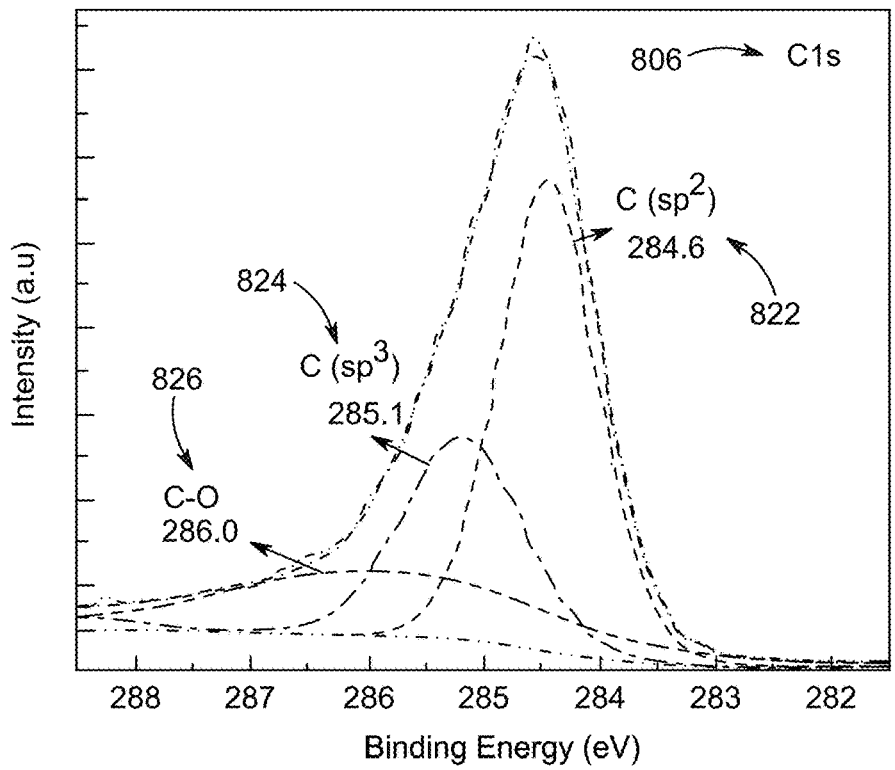
FIG. 8B is a graph depicting a deconvoluted XPS spectra of C1s, according to certain embodiments.
Figure 8C:
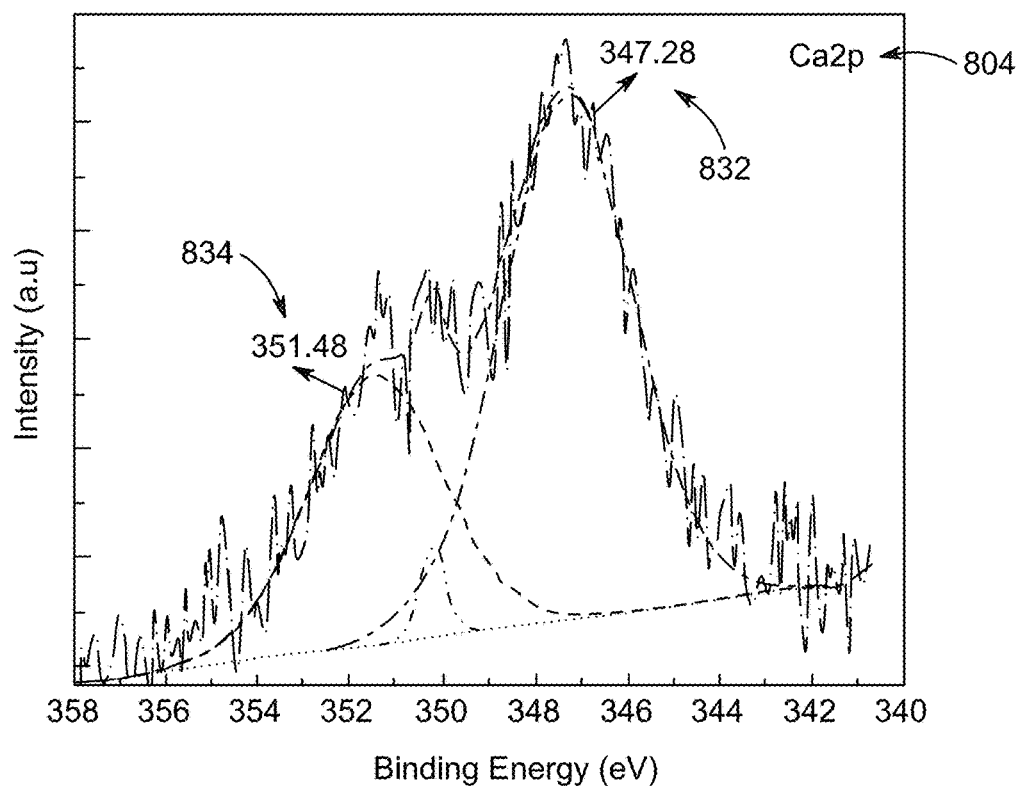
FIG. 8C is a graph depicting a deconvoluted XPS spectra of Ca2p, according to certain embodiments.
Figure 8D:
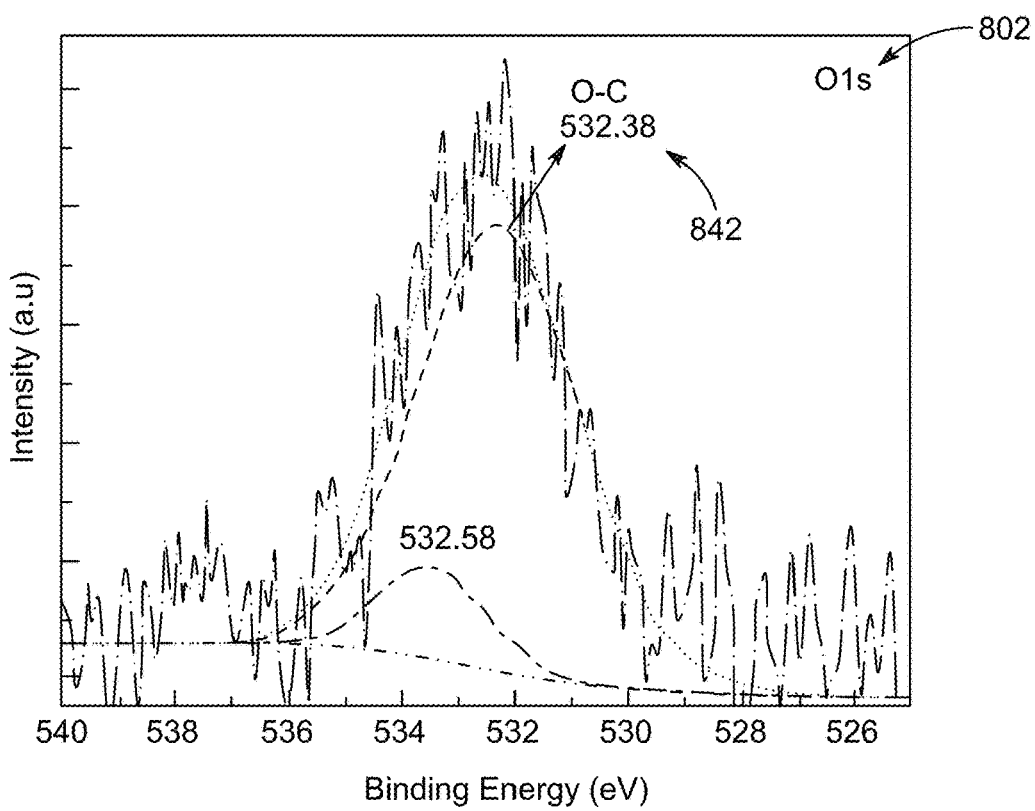
FIG. 8D is a graph depicting a deconvoluted XPS spectra of O1s, according to certain embodiments.

Strong peaks of the C1s 806, Ca2p 804, and O1s 802 are confirmed from FIGS. 8B-8D, respectively. FIG. 8B presents a deconvoluted XPS spectrum of the C1s 806. The spectrum 806 indicates the presence of $sp^2$ C 822 (peak at 284.6 eV) and $sp^3$ C 824 (peak at 285.1 eV) hybridized carbon as well as C—O 826 (peak at 286 eV). Besides, the XPS peak (FIG. 8C) is at a binding energy of 347.28 eV 832 corresponding to Ca $2p^{1/2}$, whereas the secondary XPS peak is at a binding energy of 351.48 eV 834 corresponding to Ca $2p^{1/2}$. A peak at 532.18 eV 842 in the O1s XPS spectra 802 shown in FIG. 8D corresponds to O—C.

Figure 9:
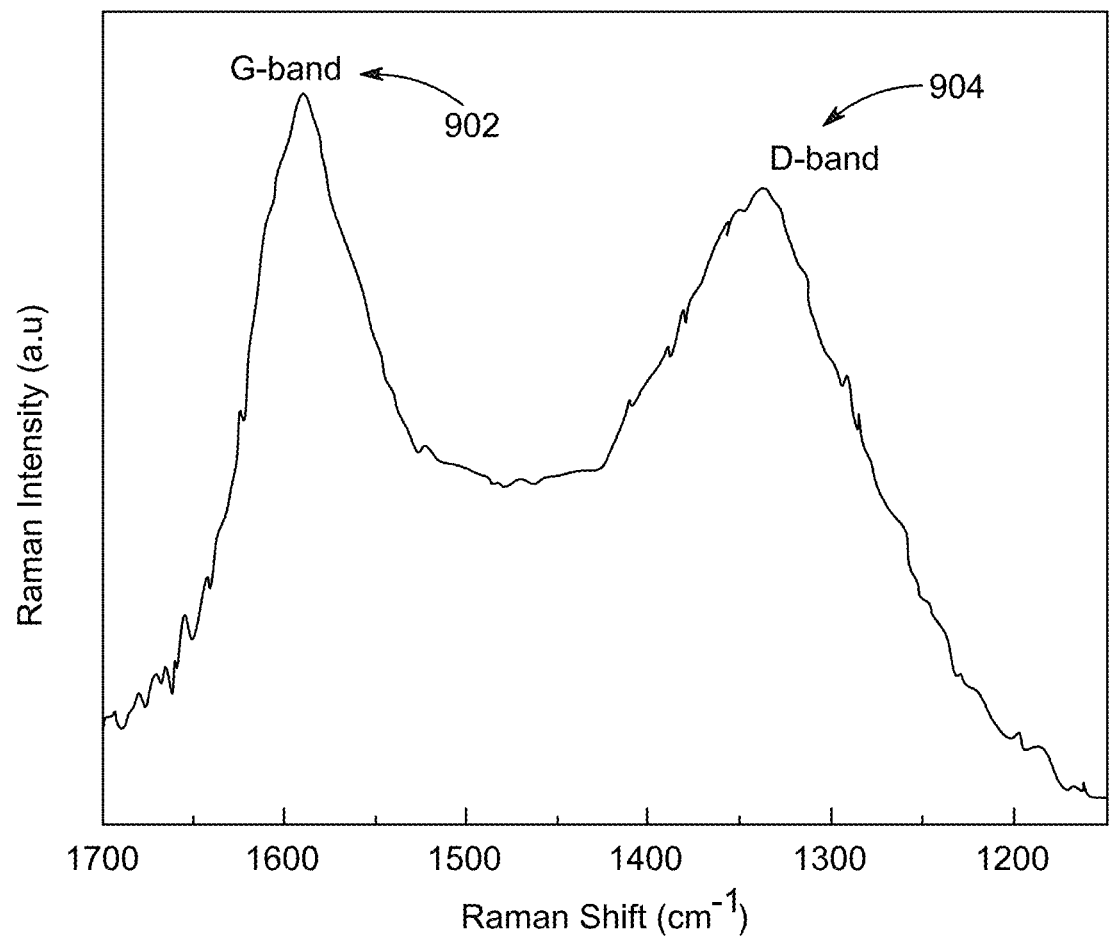
FIG. 9 is a graph depicting Raman spectra of the submicron-/nano-jute carbon obtained after 15 hours of ball milling of the grinded jute carbon, according to certain embodiments.

FIG. 9 shows the Raman spectra of the submicron-/nano-jute carbon obtained after 15 hours of ball milling of the grinded jute carbon. Peaks observed at 1591 $cm^{-1}$ and 1338 $cm^{-1}$ are the most intense. The peak at 1591 $cm^{-1}$ is the G-band peak 902 and the peak at 1338 $cm^{-1}$ is the D-band peak 904. The G-band peak 902 can be attributed to the stretching of C—C in graphitic carbon in $sp^2$ hybridized carbon structure. The occurrence of additional band in the carbon structure, i. e., the D-band peak 904, is induced by disorder or defects. Further, width of the G-band and D-band peaks (902, 904) indicated that the carbon is amorphous in nature. However, IG/ID (IG=intensity of the G-band, ID=intensity of the D-band) ratio calculated from the present spectra of carbon is 1.36, which indicates that the carbon contains an efficient amount of $SP^2$ in the graphitic carbon.

Example 3: Corrosion Evaluation of Submicron-/Nano-Jute Carbon Composite

Figure 10:
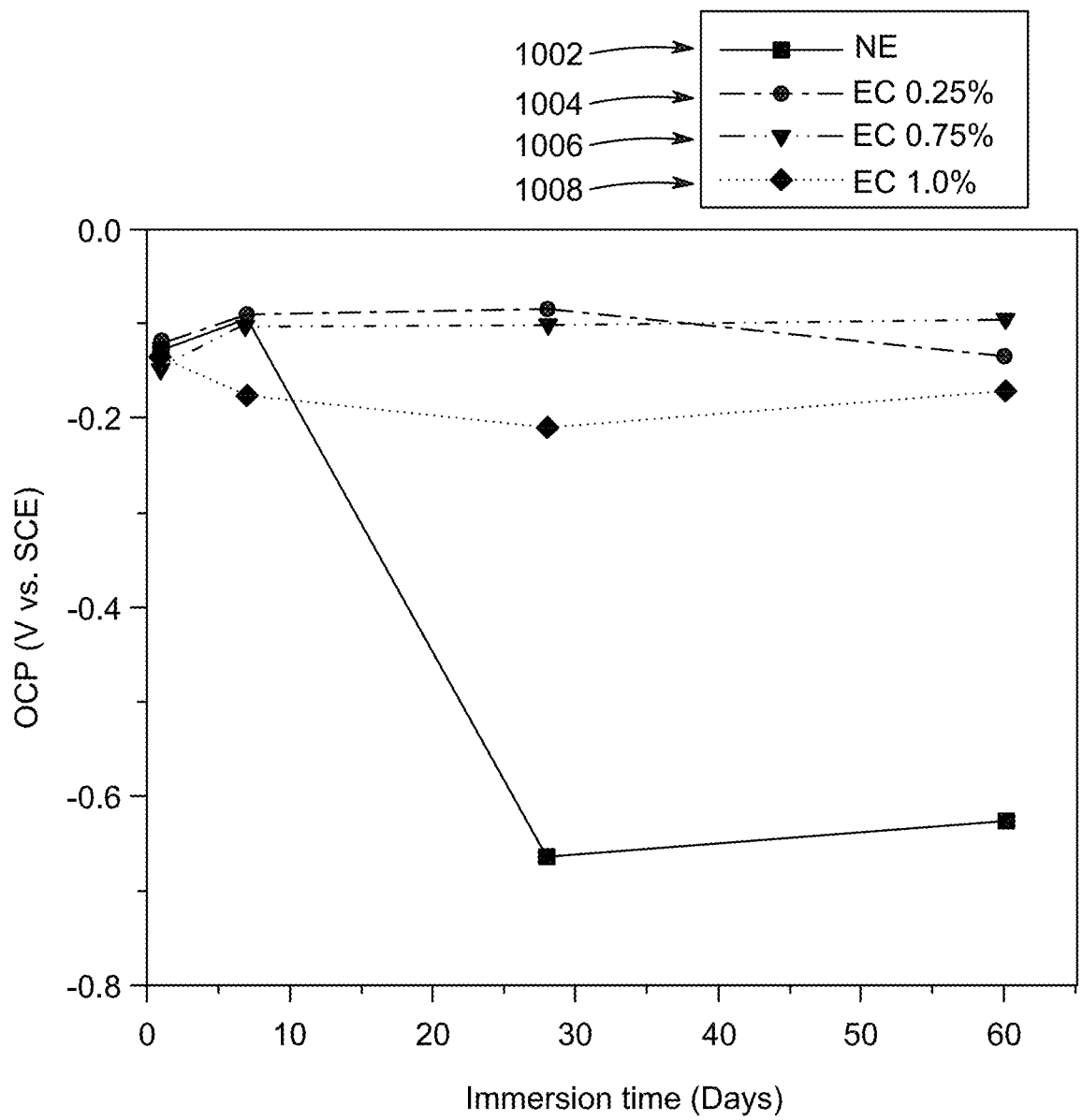
FIG. 10 is a graph depicting Open Circuit Potential (OCP) on MS coated with neat epoxy coating and composite epoxy coatings measured at different time intervals while exposing to 3.5% NaCl solution, according to certain embodiments.

OCP was recorded for all the coatings before running the EIS measurements. FIG. 10 presents the OCP values of neat epoxy coating 1002 and composite epoxy coatings (EC 0.25% 1004, EC 0.75% 1006, EC 1.0% 1008 measured at different time intervals while exposing the specimens to 3.5% NaCl solution. The OCP values for the neat epoxy coating 1002 were less negative during initial immersion, although the OCP values decreased with time. However, the OCP values for the specimens with the composite epoxy coatings (EC 0.25% 1004, EC 0.75% 1006, EC 1.0% 1008 were less negative and almost stable with time, confirming the beneficial effect of the composite epoxy coating in resisting corrosion. More negative the OCP values on the neat epoxy coating 1002 indicate the diffusion of chloride ions to the metal substrate. Further, the less negative and stable values of the OCP on the coated specimens indicate that the developed submicron-/nano-jute carbon-incorporated composite epoxy coating was effective in resisting the diffusion of chloride ions to the metal substrate in a long run. Hence, FIG. 10 indicates that the performance of coating incorporating the developed submicron-/nano-jute carbon was better than that of the neat epoxy coating 1002. The EC 0.75% 1006 exhibited less negative and stable OCP values, indicating desired for better performance among the coatings investigated.

Mechanistic and kinetic information on corrosion of steel coated with the neat and composite epoxy coatings was assessed using the EIS. The AC impedance response of the steel specimens coated with the neat and composite epoxy coating was measured for 30 minutes and 1, 7, 28 and 60 days of exposure to 3.5% NaCl. The Nyquist plots for the steel specimens coated with neat epoxy coating (1122, 1132, 1142, 1152, 1162, FIGS. 11A-11E, respectively) and composite epoxy coatings containing 0.25, 0.75 and 1.0% of the submicron-/nano-jute carbon EC 0.25% (1124, 1134, 1144, 1154, 1164, FIGS. 11A-11E, respectively), EC 0.75% (1126, 1136, 1146, 1156, 1166, FIGS. 11A-11E, respectively) and EC 1.0% (1128, 1138, 1148, 1158, 1168, FIGS. 11A-11E, respectively)) at different exposure periods are shown in FIGS. 11A-11E and corresponding Bode plots representing log of impedance modulus (|Z|) and phase angle versus log of frequency (Hz) for neat epoxy coating (1222, 1232, 1242, 1252, 1262, FIGS. 12A-12E, respectively) and composite epoxy coatings containing 0.25, 0.75 and 1.0% of the submicron-/nano-jute carbon (EC 0.25% (1224, 1234, 1244, 1254, 1264, FIGS. 12A-12E, respectively), EC 0.75% (1226, 1236, 1246, 1256, 1266, FIGS. 12A-12E, respectively) and EC 1.0% (1228, 1238, 1248, 1258, 1268, FIGS. 12A-12E, respectively) at different exposure periods are shown in FIGS. 12A-12E.

Figures 11A, 11B:
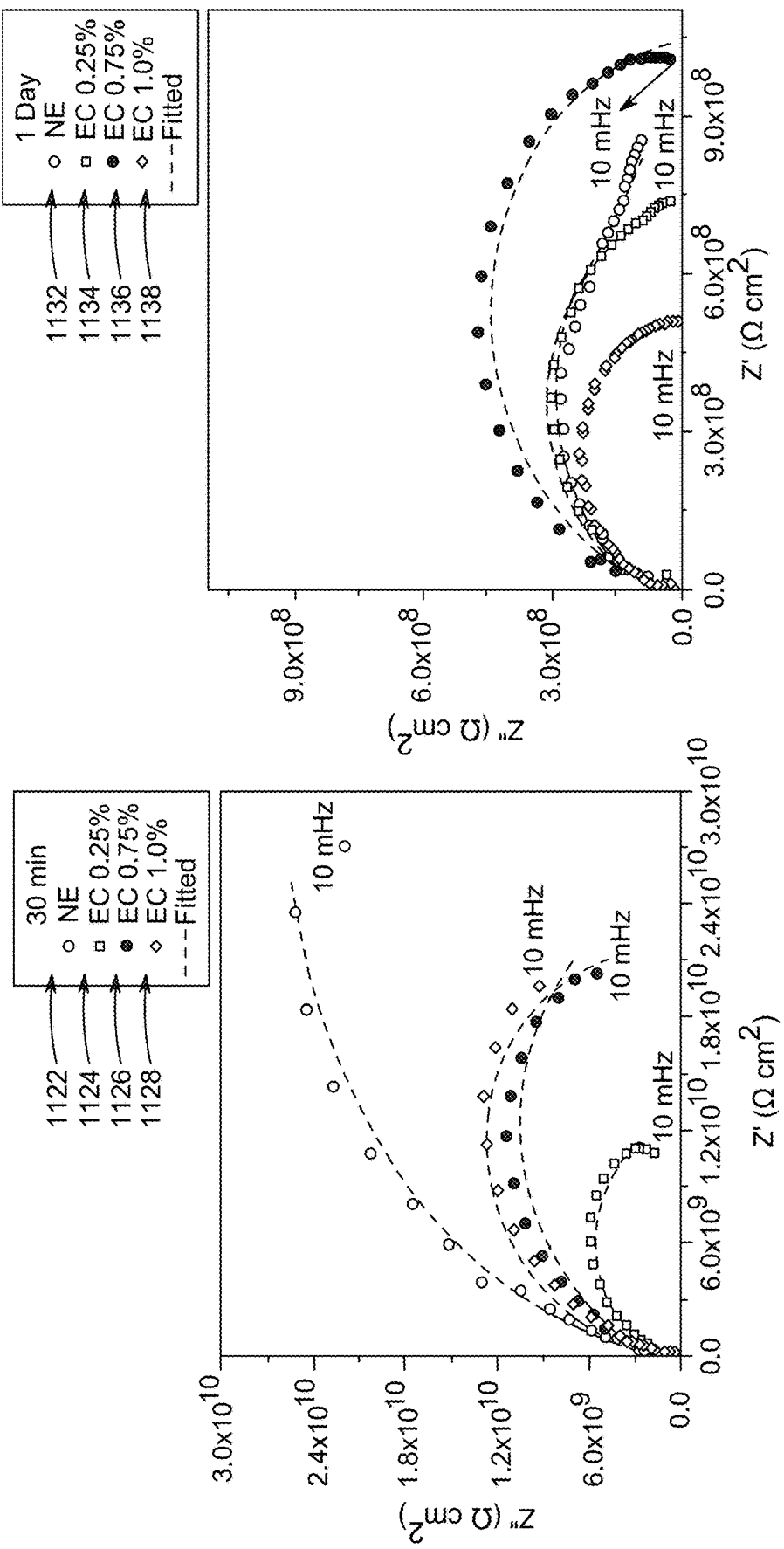
FIG. 11A is a Nyquist plot for MS specimens coated with neat epoxy and composite epoxy coatings and exposed to a 3.5% NaCl solution for 30 minutes, according to certain embodiments.
FIG. 11B is a Nyquist plot for MS specimens coated with neat epoxy and composite epoxy coatings and exposed to a 3.5% NaCl solution for 1 day, according to certain embodiments.
Figures 11C, 11D:
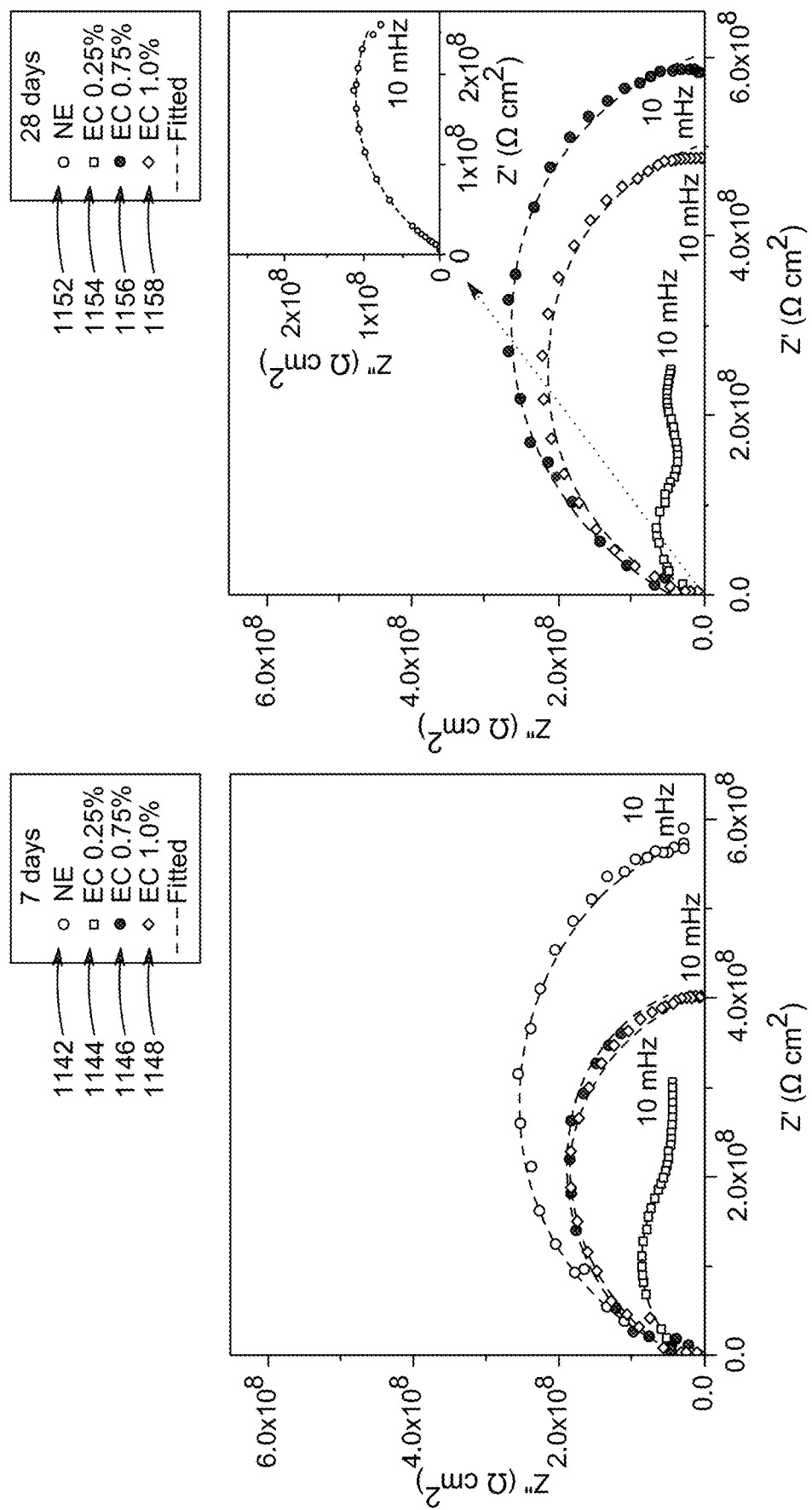
FIG. 11C is a Nyquist plot for MS specimens coated with neat epoxy and composite epoxy coatings and exposed to a 3.5% NaCl solution for 7 days, according to certain embodiments.
FIG. 11D is a Nyquist plot for MS specimens coated with neat epoxy and composite epoxy coatings and exposed to a 3.5% NaCl solution for 28 days, according to certain embodiments.
Figure 12A:
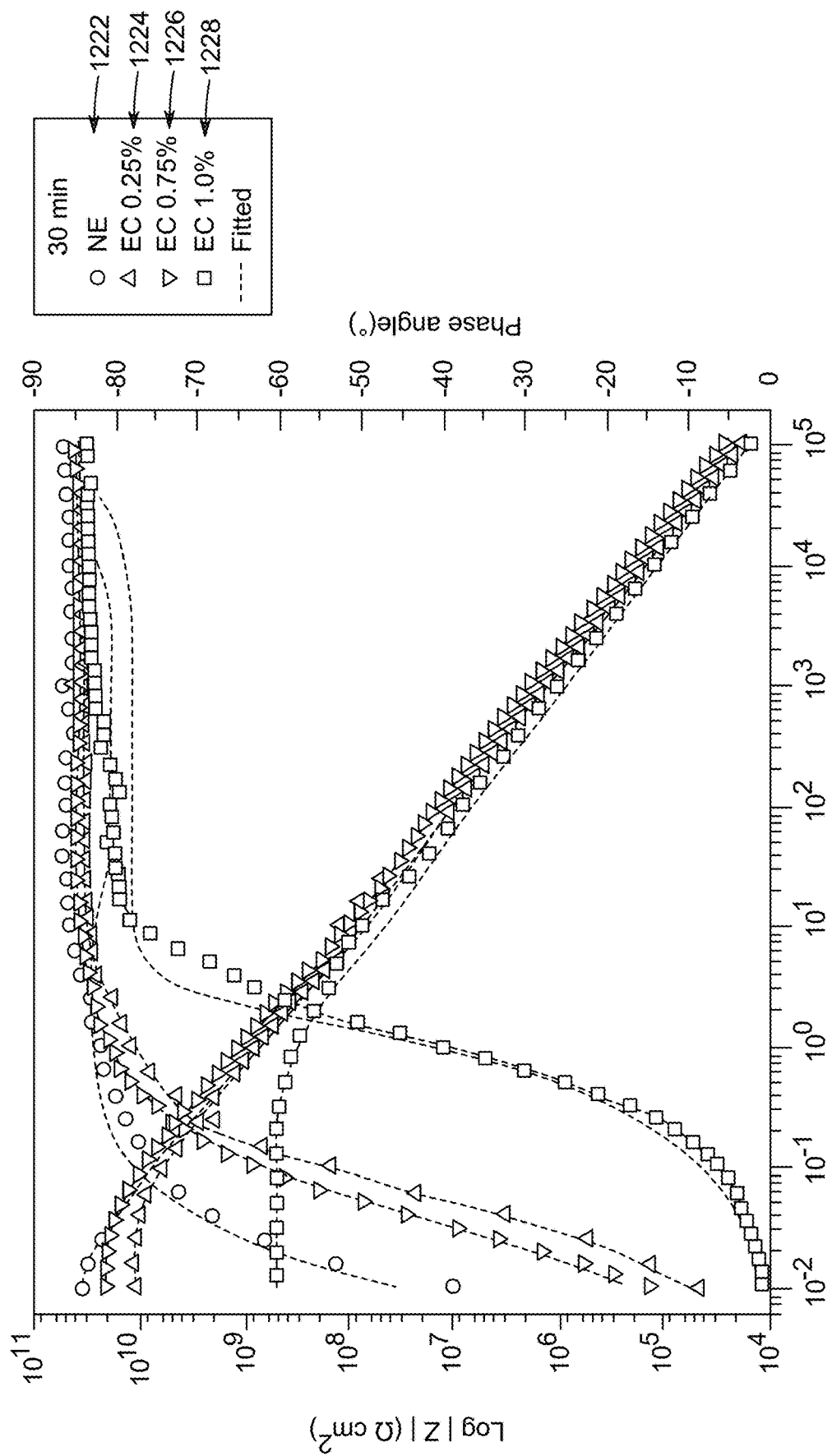
FIG. 12A is a Bode plot for MS specimens coated with neat epoxy and composite epoxy coatings and exposed to a 3.5% NaCl solution for 30 minutes, according to certain embodiments.
Figure 12B:
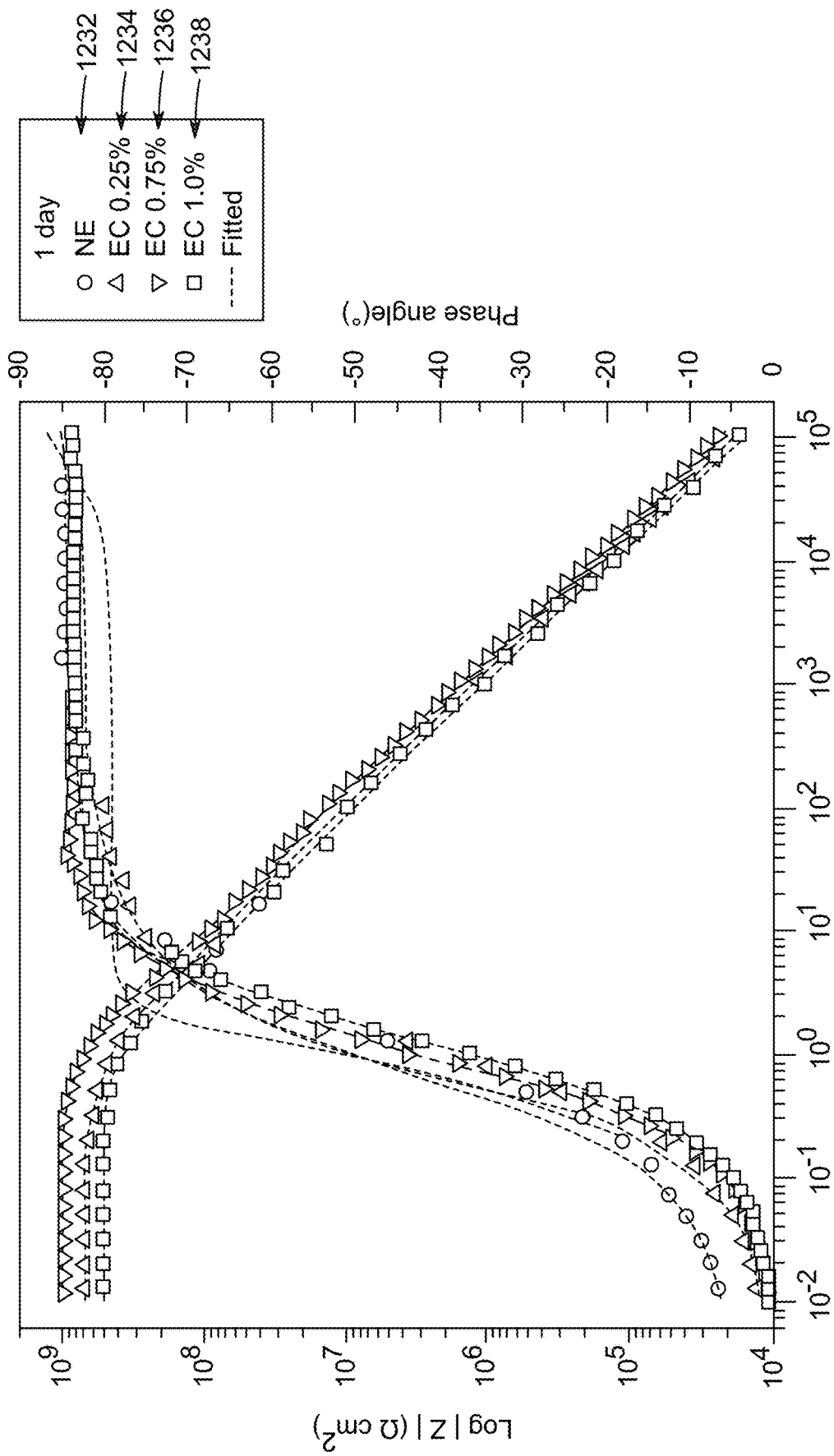
FIG. 12B is a Bode plot for MS specimens coated with neat epoxy and composite epoxy coatings and exposed to a 3.5% NaCl solution for 1 day, according to certain embodiments.
Figure 12C:
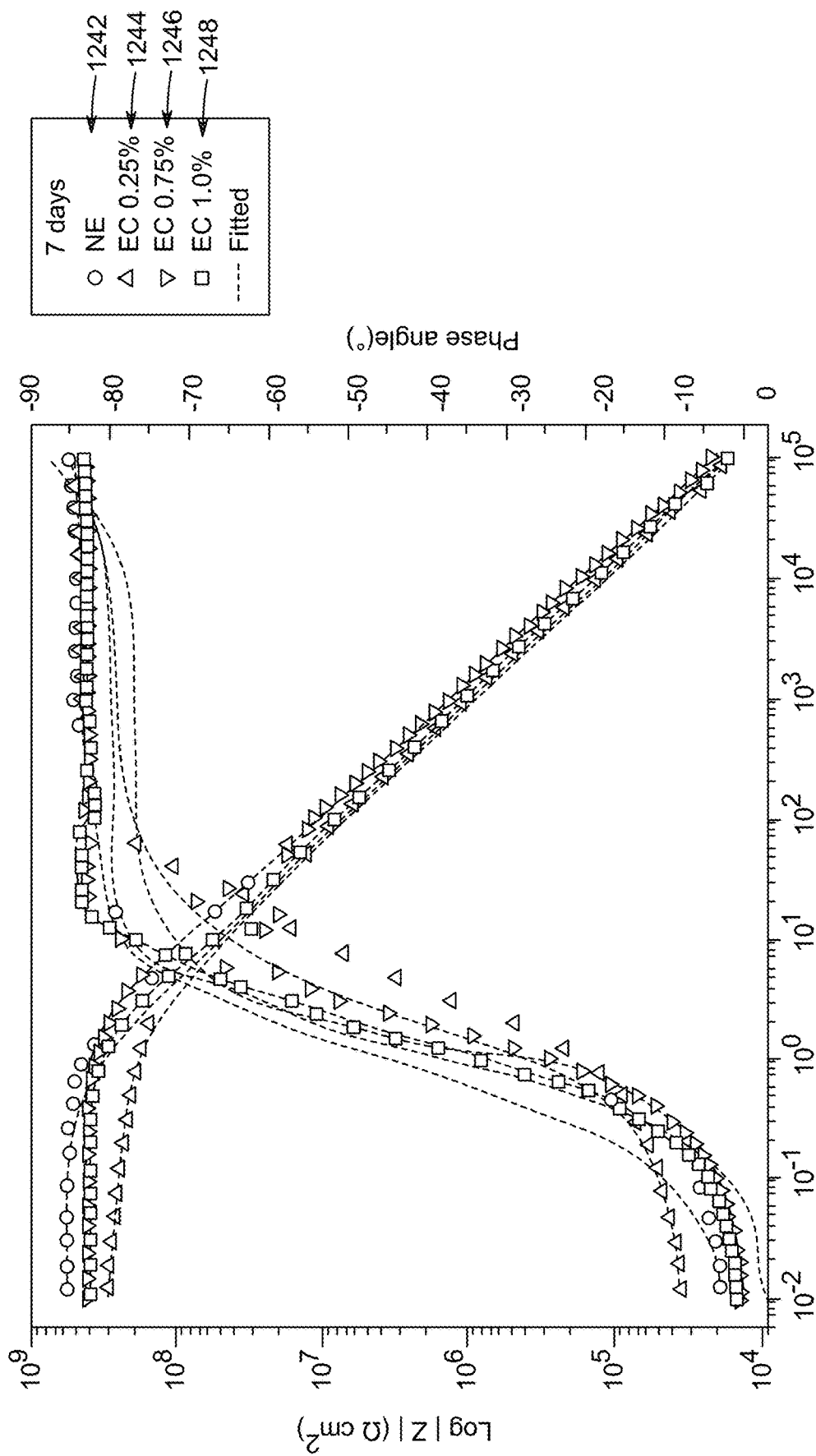
FIG. 12C is a Bode plot for MS specimens coated with neat epoxy and composite epoxy coatings and exposed to a 3.5% NaCl solution for 7 days, according to certain embodiments.
Figure 12D:
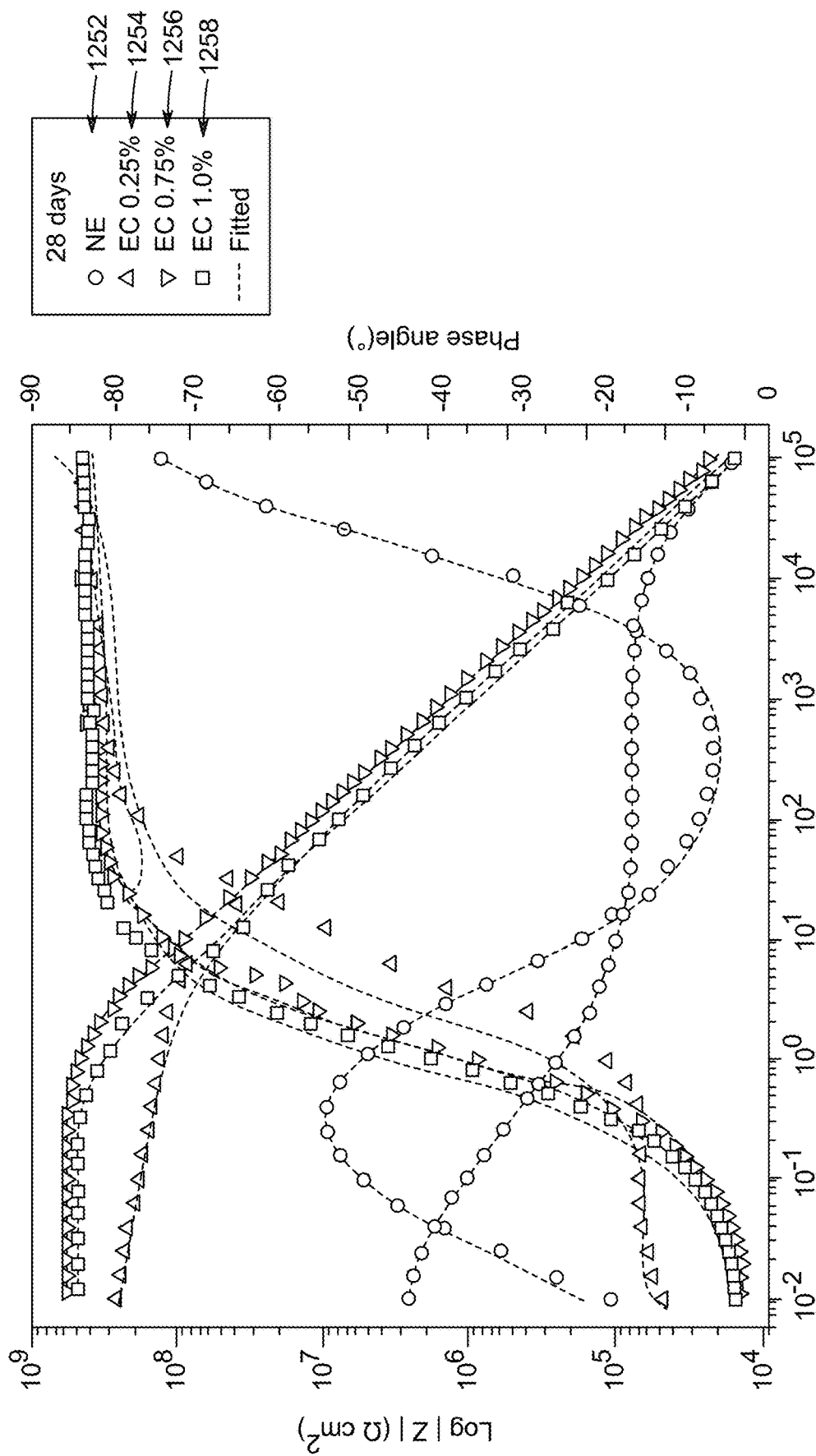
FIG. 12D is a Bode plot for MS specimens coated with neat epoxy and composite epoxy coatings and exposed to a 3.5% NaCl solution for 28 days, according to certain embodiments.

At an initial immersion time, the neat epoxy coating 1122 exhibited larger diameter distorted semi-circular capacitive arc compared to the composite epoxy coatings (1124, 1126, 1128) in Nyquist plot (FIG. 11A) and a linear capacitive behaviour with high impedance values in the Bode plot (FIG. 12A), indicating better performance of the neat epoxy coating in resisting any ionic transfer within the coating. The impedance modulus |Z| at 0.01 Hz for the neat epoxy coating was in the range of $10^{10}$ ohm square centimetre ($\Omega cm^2$), whereas for the composite epoxy coatings, the impedance modulus |Z| was around $10^8$-$10^{10}$ $\Omega cm^2$ following an order of neat epoxy >EC 0.75%>EC 0.25%>EC 1.0%. The impedance values were of the order of $10^9$-$10^{10}$ $\Omega cm^2$ in epoxy coating with the carbon nanotubes (<1 wt. %) and zinc (60%). However, after 1 day till seven days of exposure to the chloride solution, the diameter of the semicircular capacitive arc drastically decreased and the impedance value of the coating at low frequencies significantly dropped in the Bode plot as shown in FIGS. 11B-11C and FIGS. 12B-12C. Such drop in the impedance value is attributed to the diffusion of ionic species (such as chlorides) into the neat epoxy coating matrix. Further, with extended exposure (after 28 days) the impedance spectrum changed into two time-constants, as shown in FIG. 11D and FIG. 12D, indicating the penetration of the chloride ions through the coating to the metal surface and the occurrence of corrosion reactions at the metal-coating interface. FIG. 11D and FIG. 12D are indicative of the long-run vulnerability of the neat epoxy coating in resisting the diffusion of the electrolyte to the metal substrate. The diameter of the distorted capacitive arcs for the specimens coated with the composite epoxy coating also decreased largely from 30 minutes till one-day exposure to the chloride solution. However, not much variation was noted in the capacitive curve with increased exposure to the electrolyte.

Figure 11E:
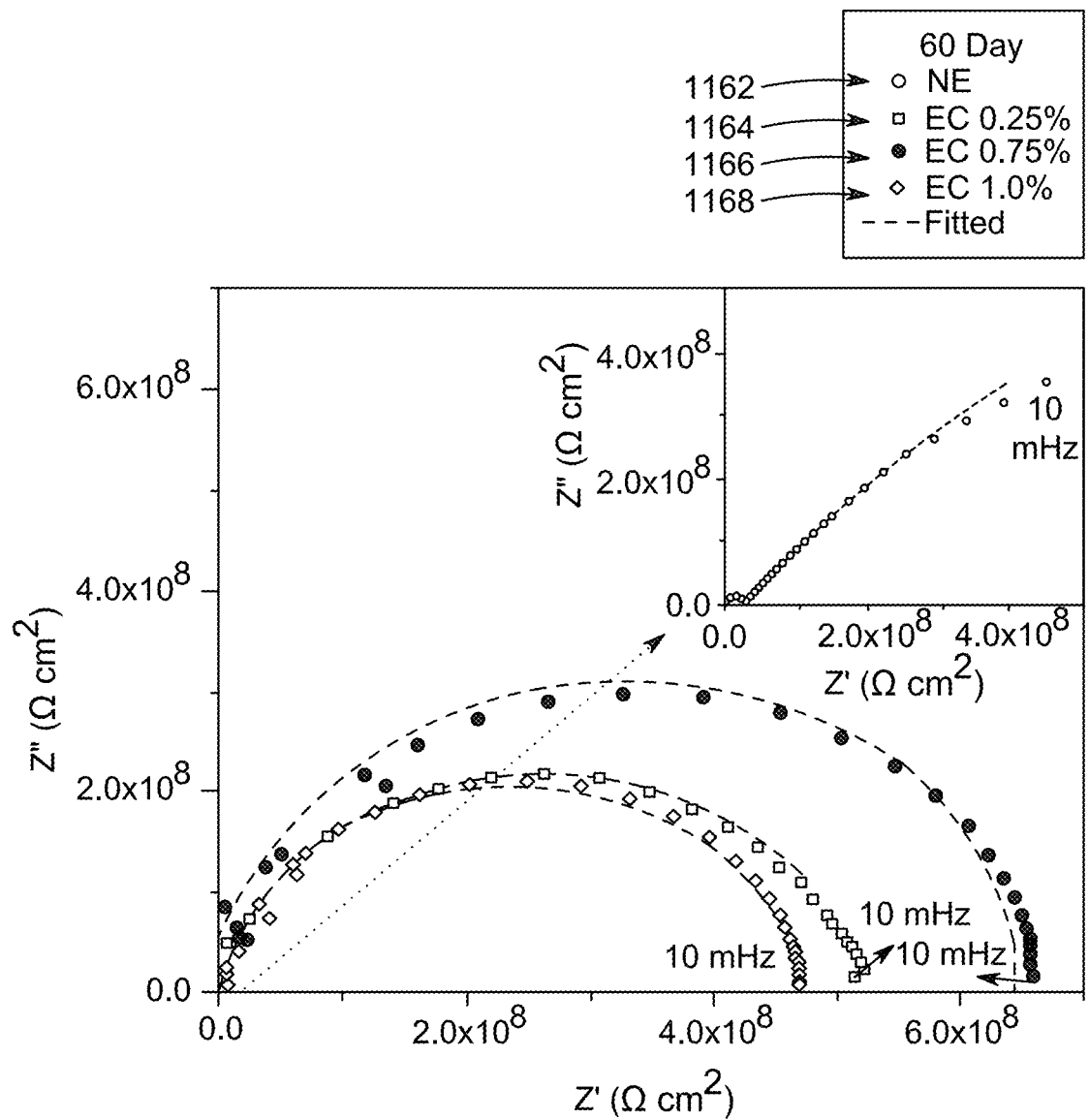
FIG. 11E is a Nyquist plot for MS specimens coated with neat epoxy and composite epoxy coatings and exposed to a 3.5% NaCl solution for 60 days, according to certain embodiments.
Figure 12E:
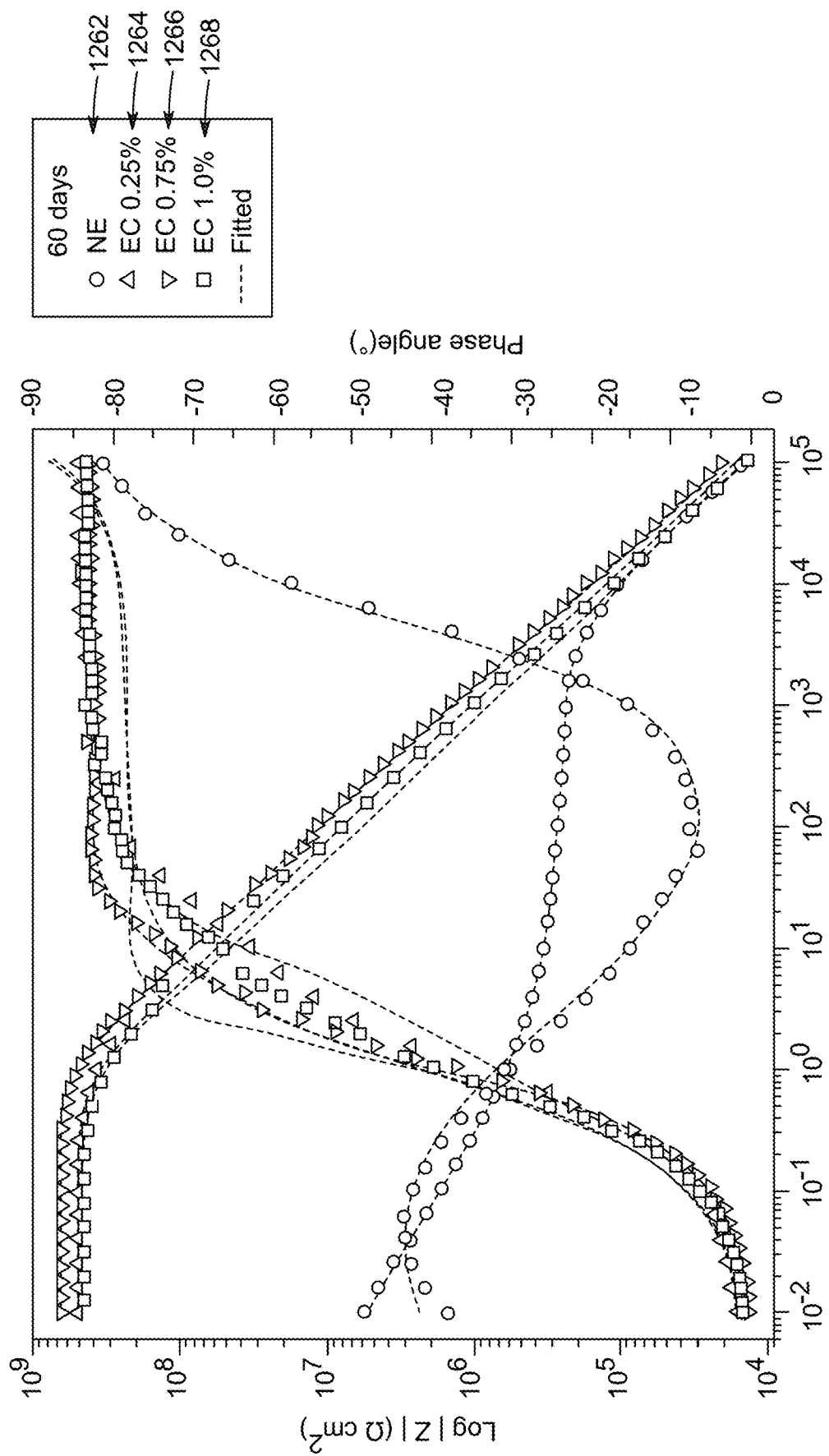
FIG. 12E is a Bode plot for MS specimens coated with neat epoxy and composite epoxy coatings and exposed to a 3.5% NaCl solution for 60 days, according to certain embodiments.

Also, the impedance modulus |Z| decreased significantly from initial 30 minutes till 1 day of exposure. However, no significant change with further exposure was observed and the impedance modulus |Z| was around $10^8$ $\Omega cm^2$ throughout the test duration of 60 days as shown in FIG. 11E and FIG. 12E. Moisture uptake by the coating can be the reason for the decrease in the impedance value during the initial immersion time; however, the barrier properties of the nano-carbon resisted the diffusion of the electrolyte at later point of time. FIGS. 11A-11E and 12A-12E indicate the excellent barrier performance of the jute carbon nanoparticles in the composite epoxy coatings in minimizing corrosion of the metal substrate. However, among the different concentrations of carbon in composite epoxy coatings, the corrosion resistance of coating with 0.75% carbon was the highest.

Figure 13A:
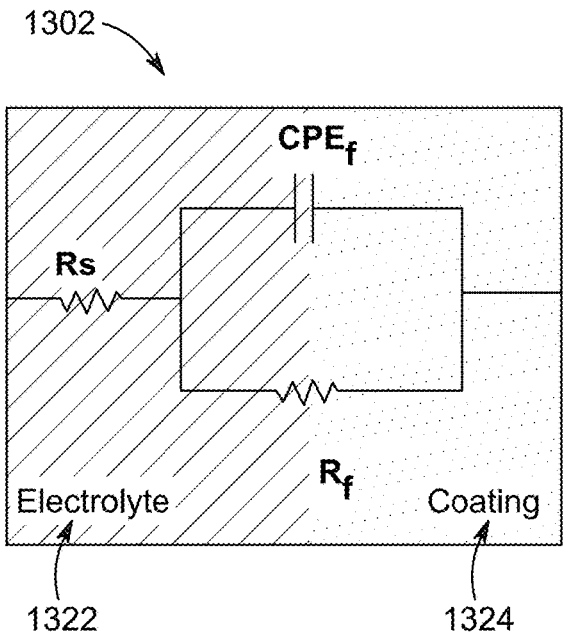
FIG. 13A is an equivalent circuit for fitting of electrochemical impedance spectroscopy (EIS) data during initial immersion period, according to certain embodiments.
Figure 13B:
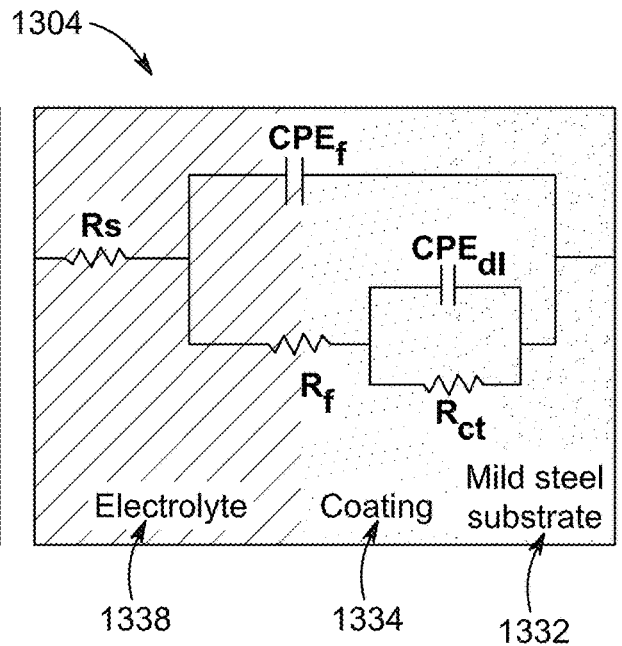
FIG. 13B is an equivalent circuit for fitting of EIS data after penetration of the electrolyte into coating, according to certain embodiments.
Figure 13C:
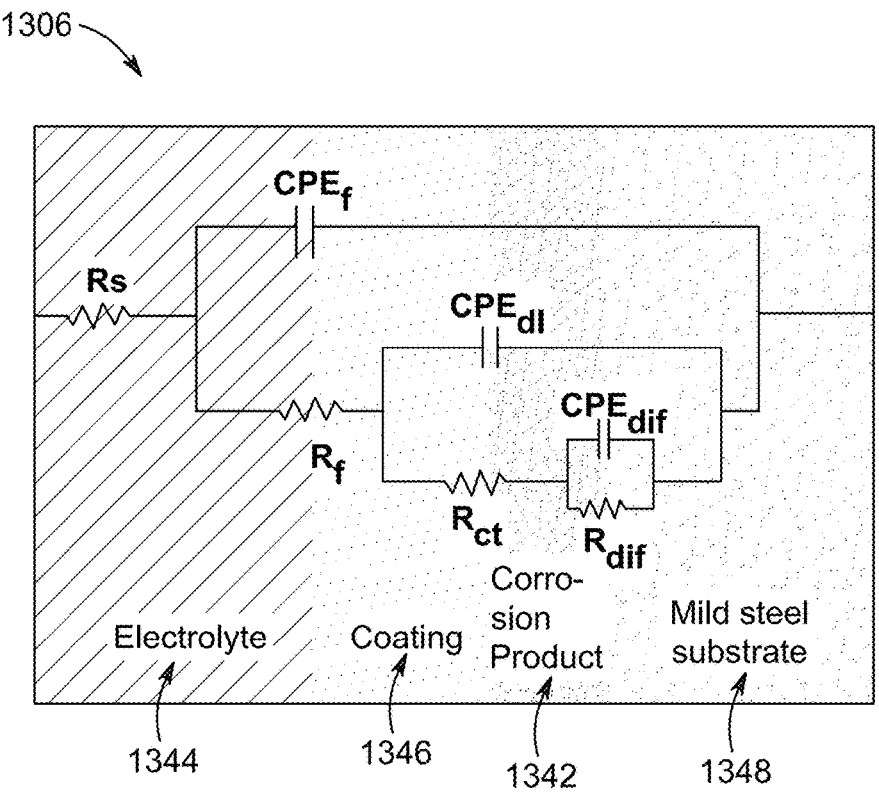
FIG. 13C is an equivalent circuit for fitting of the EIS data after the formation of corrosion products, according to certain embodiments.

FIGS. 13A-13C depict equivalent circuits (1302, 1304, 1306, respectively) used for fitting the EIS impedance data of the neat and composite epoxy coatings to obtain information on electrochemical parameters. The EIS impedance data for an initial immersion period of 30 minutes was fitted using the equivalent circuit 1302 in FIG. 13A, where $R_s$ stands for resistance offered by an electrolyte 1322, $R_f$ is the resistance of a coating film 1324 to the passage of the electrolyte 1322, and $CPE_f$ is the constant phase element for the coating capacitance. The EIS impedance data for more than 30 minutes (1 day or more) of exposure were fitted using the electrical circuit 1304 shown in FIG. 13B, where $R_{ct}$ represents the charge transfer resistance across a metal surface 1332 and $CPE_{dl}$ represents the constant phase element for the double layer capacitance between a coating interface 1334 or a metal interface 1332 and an electrolytic solution 1338. However, for long periods of immersion (more than 28 days), impedance spectra of the neat epoxy coating exhibited two-time constants attributable to the accumulation of the corrosion products at the coating interface 1334 or metal interface 1332 and, as such, the equivalent circuit 1304 shown in FIG. 13B can no longer be used. Thus, to accommodate the impedance produced by a corrosion product 1342, the equivalent circuit 1306 shown in FIG. 13C (where an electrolyte 1344, a coating 1346 and a metal 1348 are present) was opted, where $CPE_{diff}$ and $R_{diff}$ represents the diffusion capacitive and resistant component. Moreover, constant phase elements (CPEs) in the electrical circuits compensates the deviations from a non-homogenous surface of the coating to that of a perfect capacitance. The overall corrosion resistance performance of the coatings was further evaluated by interpreting the variation of the impedance modulus at a low frequency as a function of time (obtained from the Bode plots). The variation in the coating film resistance ($R_f$) and charge transfer resistance ($R_{ct}$) at the metal surface was obtained from the equivalent electrical circuits (1302, 1304, 1306, respectively), shown in FIGS. 13A-13C.

Figure 14A:
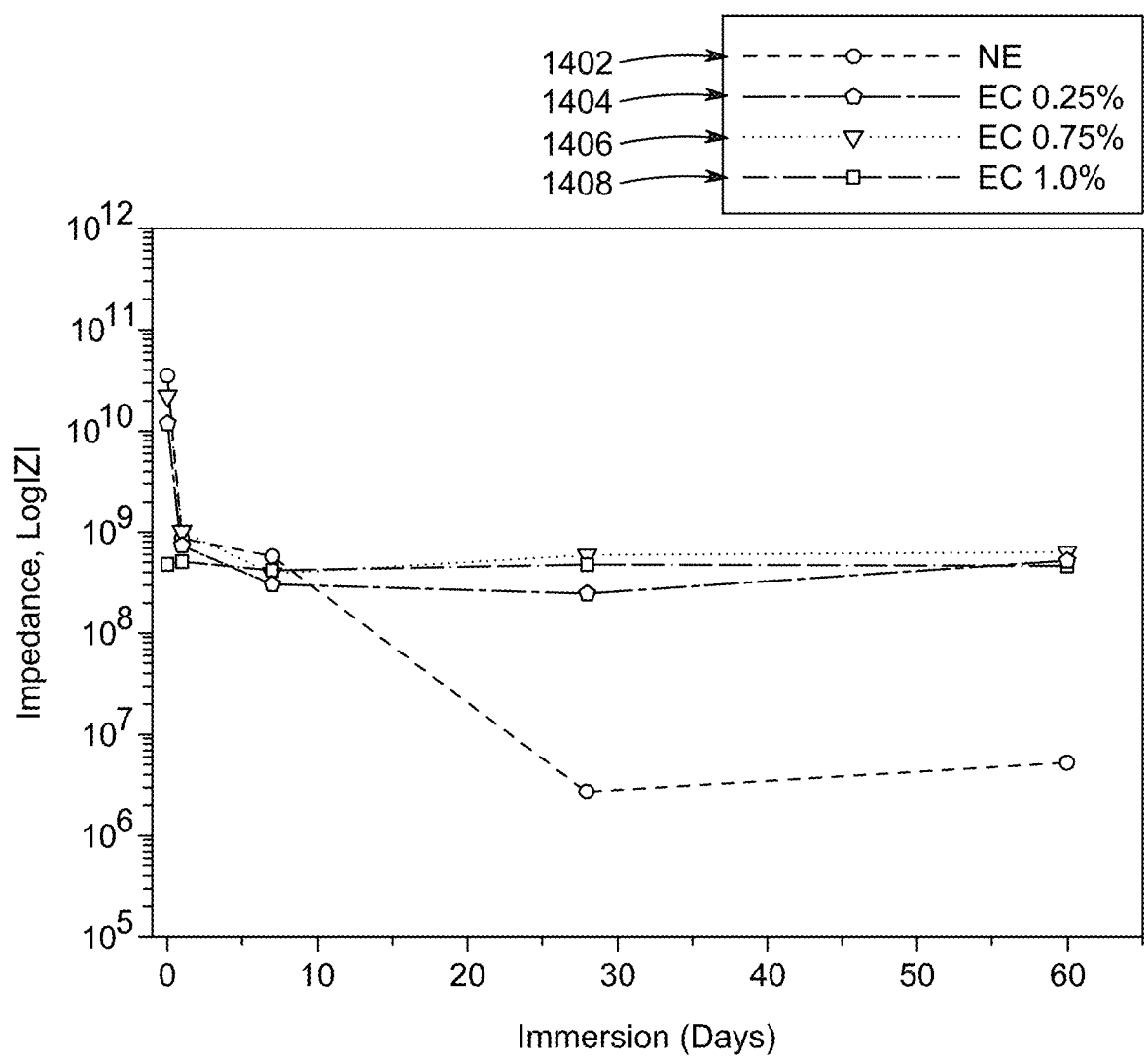
FIG. 14A is a graph depicting impedance versus immersion time plot, according to certain embodiments.

The values of impedance modulus (|Z|), $R_f$ and $R_{ct}$ versus time for specimens coated with neat epoxy coating 1402 and composite epoxy coatings containing 0.25, 0.75 and 1.0% of the submicron-/nano-jute carbon (EC 0.25% 1404, EC 0.75% 1406 and EC 1% 1408 are plotted in FIG. 14A. The impedance data shown in FIG. 14A indicate that the composite epoxy coatings exhibited a similar behaviour all over the test duration without any drop in the impedance values at higher immersion times. FIG. 14A indicates that the composite epoxy coating was less permeable even after a longer exposure and resisted the corrosion initiation. However, the impedance value of the specimens coated with the neat epoxy coating dominated during the initial immersion time, i.e., until 7 days, and beyond 7 days, the impedance value dropped drastically with time leading to the corrosion initiation within 28 days of exposure. After 28 days, the impedance value was $2.42 \times 10^8$ $\Omega cm^2$, $6 \times 10^8$ $\Omega cm^2$, $4.75 \times 10^8$ $\Omega cm^2$ in EC 0.25%, EC 0.75%, and EC 1.0%, respectively, which are two orders of magnitude more than the impedance value for the specimens coated with the neat epoxy coating ($2.68 \times 106$ $\Omega cm^2$). The impedance of the composite epoxy coatings obtained in the present study (at 60 days) are close to the values reported by published sources ($10^8$ $\Omega cm^2$) using 5 wt. % graphitic carbon nitride/ZnO nanocomposite epoxy coatings in 3.5% NaCl exposure for 60 days. Further, the present study impedance values are higher than the values reported by published sources ($10^6$ $\Omega cm^2$) incorporating 0.7 wt. % graphene oxide (GO)/zeolite molecular sieves (ZSM-5) as the best composition for anti-corrosion performance exposed to 3.5% NaCl for about 700 hours (29 days). Another essential indicator of the surface protection performance of a coating is R f.

Figure 14C:
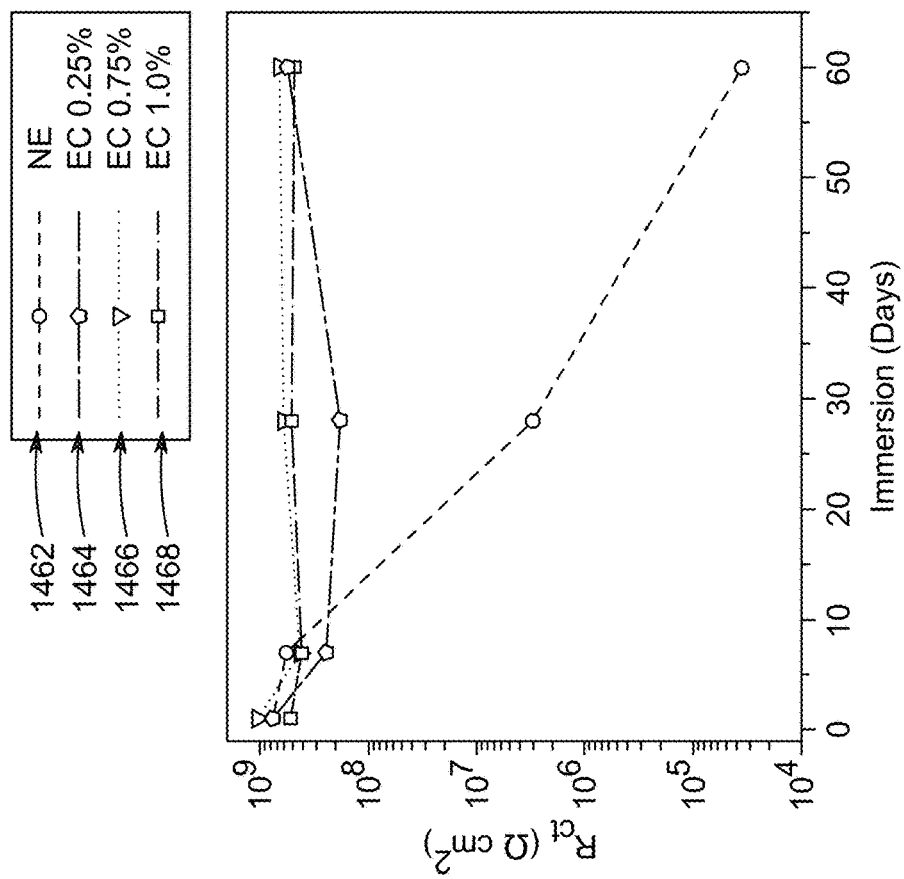
FIG. 14C is a graph depicting charge transfer resistance ($R_a$) versus immersion time plot, according to certain embodiments.
Figure 14B:
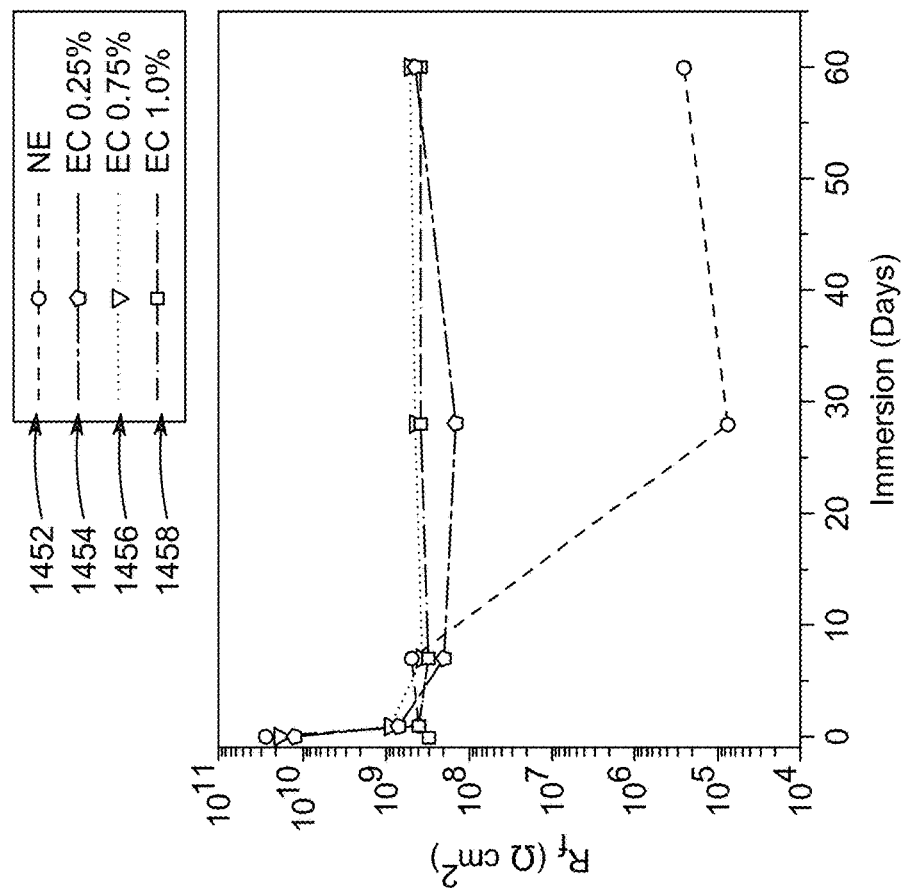
FIG. 14B is a graph depicting coating film resistance ($R_f$) versus immersion time plot, according to certain embodiments.

FIG. 14B depicts the R f of neat epoxy coating 1452 and composite epoxy coatings containing 0.25, 0.75 and 1.0% of the submicron-/nano-jute carbon (EC 0.25% 1454, EC 0.75% 1456 and EC 1% 1458) during all exposure durations. FIG. 14B shows that the R f data that the neat epoxy coating exhibited a higher resistance until 7 days, whereas with higher immersion time, the resistance of the coating started to decrease compared to the composite epoxy coatings. After 28 days of exposure, the coating resistance of the composite epoxy coatings was around $10^8$ $\Omega cm^2$, which is nearly four orders of magnitude more than that of the neat epoxy coating ($10^4$ $\Omega cm^2$). The R f values obtained in the present study are much higher than the values reported in published sources in the range of $10^4$ $\Omega cm^2$ in functionalized multiwall carbon nanotubes/polyindole nanocomposite epoxy coating exposed to 3.5% NaCl solution for 20 days at 0.25 wt. % as the best corrosion performance. Further, $R_{ct}$ a values for composite epoxy coatings containing 0.25, 0.75 and 1.0% of the submicron-/nano-jute carbon (EC 0.25% 1462, EC 0.75% 1464 and EC 1% 1466) were more than that of neat epoxy coating 1468, as shown in FIG. 14C.

The higher $R_{ct}$ a values of the composite epoxy coatings reveal the ability of the composite epoxy coatings to alleviate the corrosion process at a metal-coating interface. However, the performance of the EC 0.75% was relatively better than that of other combinations, indicating the 0.75% carbon content as the desired dosage. Thus, collectively, all impedance spectra indicate the protective performance of the composite epoxy coatings in long run compared to the neat epoxy coating. Incorporation of the uniformly distributed submicron-/nano-jute carbon the epoxy acted as a barrier by filling micropores of the coating and resisted the penetration of corrosive species to the metal substrate.

Figure 15A:
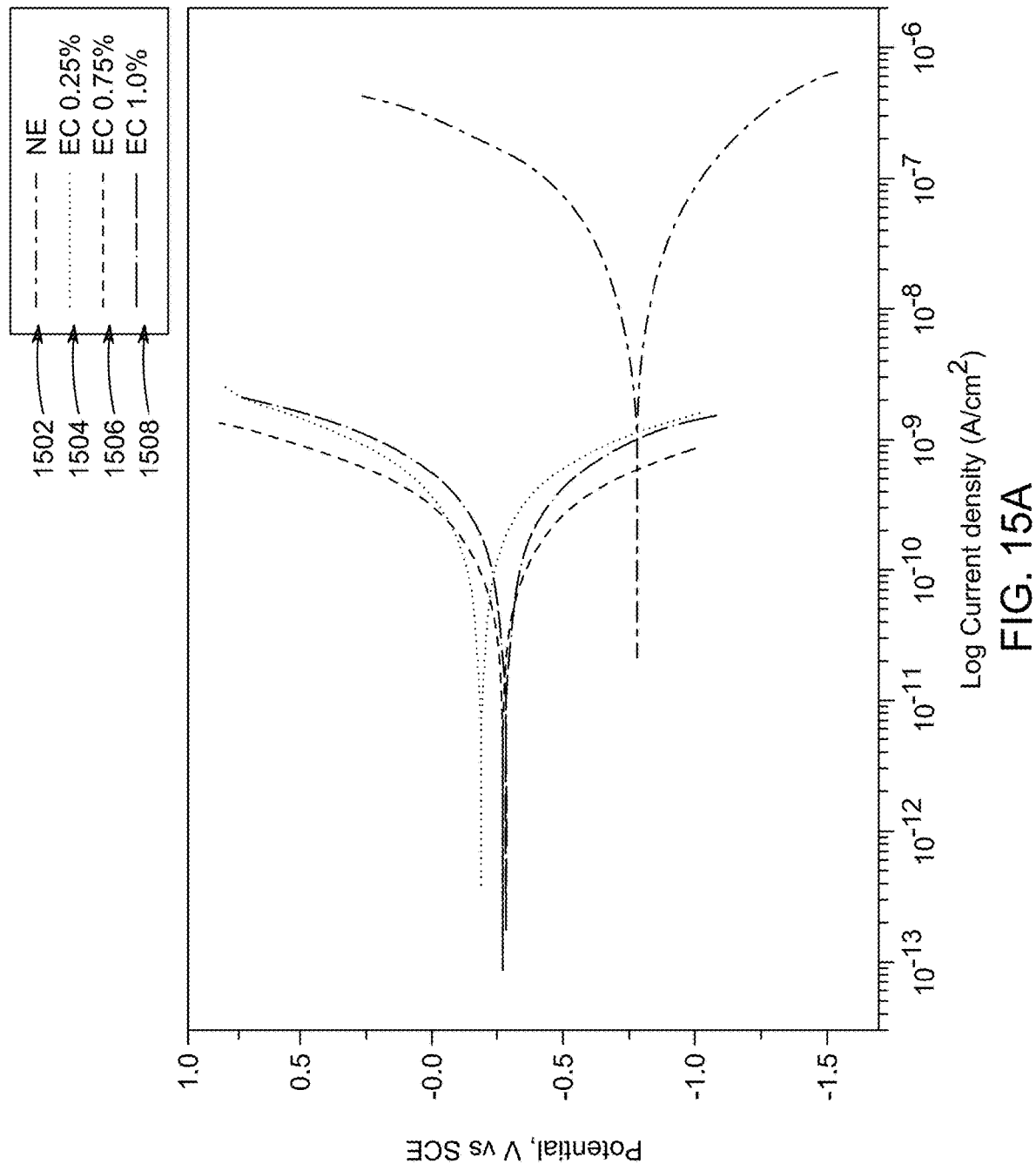
FIG. 15A is a graph depicting potentiodynamic polarization curves of MS specimens coated with neat and composite epoxy coatings and exposed to a 3.5% NaCl solution, according to certain embodiments.

Mechanistic and kinetic information on corrosion of the specimens coated with neat epoxy coating 1502 and composite epoxy coatings containing 0.25, 0.75 and 1.0% of the submicron-/nano-jute carbon (EC 0.25% 1504, EC 0.75% 1506 and EC 1% 1508 was analysed using the PDP technique. Anodic and cathodic polarization curves of the specimens coated with the neat epoxy coating 1502 and the EC 0.25% 1504, EC 0.75% 1506 and EC 1% 1508 exposed to 3.5% NaCl solution for 60 days are shown in FIG. 15A. Uniform corrosion was noted in all the coated specimens. The corrosion potential was −0.776 V (versus SCE) for the specimen coated with the neat epoxy, whereas the corrosion potential was in the range of −0.278 to −188 V (versus SCE) in the specimens coated with the composite epoxy coating incorporating the submicron-/nano-jute carbon, indicating that including the submicron-/nano-jute carbon improved the coating. FIG. 15A also shows that the anodic and cathodic current densities of the composite epoxy coating decreased compared to the neat epoxy coating, indicating restraining of the anodic and cathodic reactions at the metal surface. The electrochemical parameters, such as corrosion current density ($i_{corr}$), corrosion potential ($E_{corr}$), anodic Tafel slope ($\beta_a$), and cathodic Tafel slope ($\beta_c$) obtained PDP plots, are summarized in Table 1.

TABLE 1

Electrochemical parameters for the specimens coated with neat and composite coating and exposed to 3.5% NaCl solution.

| Coating | $E_{corr}$ [mV vs SCE] | βa V/dec. | βc V/dec. | $i_{corr}$ [μA/cm²] | Corrosion rate [mmpy] |
|---|---|---|---|---|---|
| Neat epoxy | −776 | 0.422 | 0.284 | 0.0148 | 2.631E−03 |
| EC 0.25% | −188 | 2.534 | 2.704 | 0.00111 | 0.197E−03 |
| EC 0.75% | −271 | 3.031 | 2.946 | 0.00075 | 0.132E−03 |
| EC 1.0% | −278 | 2.237 | 2.062 | 0.00093 | 0.164E−03 |

Figure 15B:
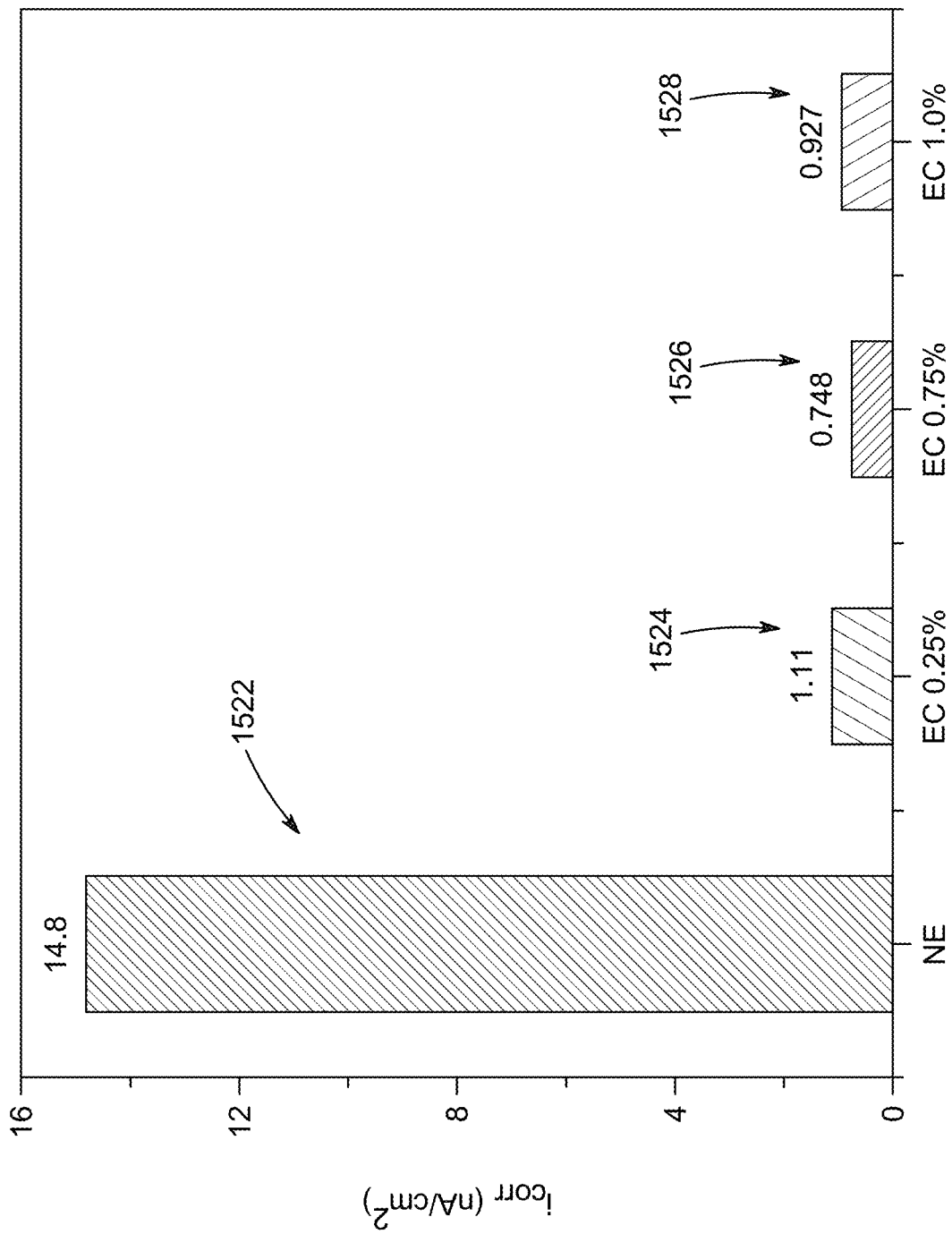
FIG. 15B is a bar graph depicting corrosion current density on MS specimens coated with neat and composite epoxy coatings and exposed to a 3.5% NaCl solution, according to certain embodiments.

The $i_{corr}$ on specimens coated with neat epoxy coating 1522 and EC 0.25% 1524, EC 1526 and EC 1% 1528 is depicted in FIG. 15B. The $i_{corr}$ on the specimens coated with the composite epoxy coatings was less than that on the specimens coated with the neat epoxy coating. The $i_{corr}$ on the specimens coated with EC 0.25% 1524, EC 0.75% 1526 and EC 1% 1528 decreased by 92.5%, 95%, and 93.7%, respectively, compared to the neat epoxy coating 1522. FIGS. 15A-15B indicate that the incorporation of submicron-/nano-jute carbon significantly improves the corrosion resisting performance of the neat epoxy coating.

The corrosion resistance performance of the specimens coated with the neat and composite epoxy coatings was examined through the salt spray exposure. A vertical uniform V-cut was made in the centre of each coated specimen as per the ASTM D 1654 prior to placing the coated specimen in the salt spray chamber. Width of the scribe on each specimen was measured using a crack-measuring microscope at six representative locations. The specimens were then exposed to 5% NaCl spray for 1000 hours. After the exposure, the specimens were removed, cleaned and photographed. The width of the scribe after exposure was measured again at six representative locations representing maximum and minimum corrosion and discoloration. Rust creepage of the coated specimens after the salt spray exposure was determined using equation (1).

$$C = \frac{Wc - W}{2} \tag{1}$$

Figure 16:
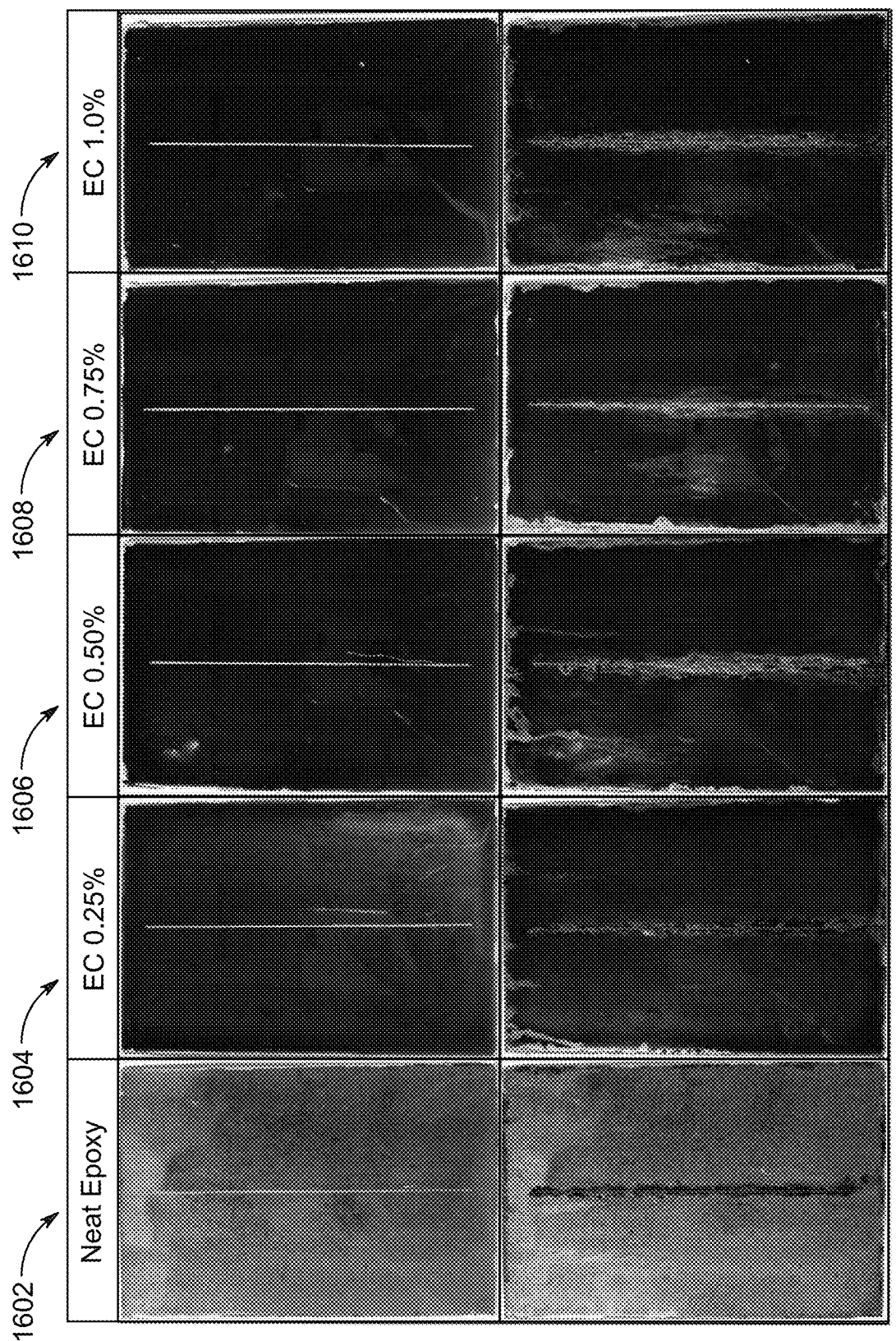
FIG. 16 is an image depicting MS specimens coated with neat epoxy and composite epoxy coating before and after exposure to the salt spray, according to certain embodiments.

Where, Wc is mean width of the scribe after exposure, W is mean width of the original scribe. The coated specimens before and after 1000 hours of the salt spray exposure are shown in FIG. 16. Width of the scribe before and after the exposure, and the calculated rust creepage are summarized in Table 2.

TABLE 2

Scribe width, rust creepage, and performance rating of the of specimens coated with neat and composite coatings.

| Coating | Width before exposure, W [mm] | Mean width after exposure, Wc [mm] | Rust creepage, C [mm] | Rating as per ASTM D 1654 |
|---|---|---|---|---|
| Neat epoxy | 0.7 | 6.1 | 2.7 | 6 |
| EC 0.25% | 0.6 | 4.95 | 2.18 | 6 |
| EC 0.75% | 0.75 | 1.75 | 0.5 | 9 |
| EC 1.0% | 0.82 | 2.27 | 0.73 | 8 |

The extent of corrosion products or the coating degradation is higher in the specimens coated with neat epoxy coating 1602 compared to the specimens coated with EC 0.25% 1604, EC 0.50% 1606, EC 0.75% 1608 and EC 1% 1610. The salt spray evaluation indicates better anticorrosion performance of the composite epoxy coatings (1604, 1606, 1608, 1610) than the neat epoxy coating 1602. Among the composite epoxy coatings, the EC 0.75% 1608 performed the best followed by the EC 1.0% 1610 and the EC 0.25% 1604.

Figure 17A:
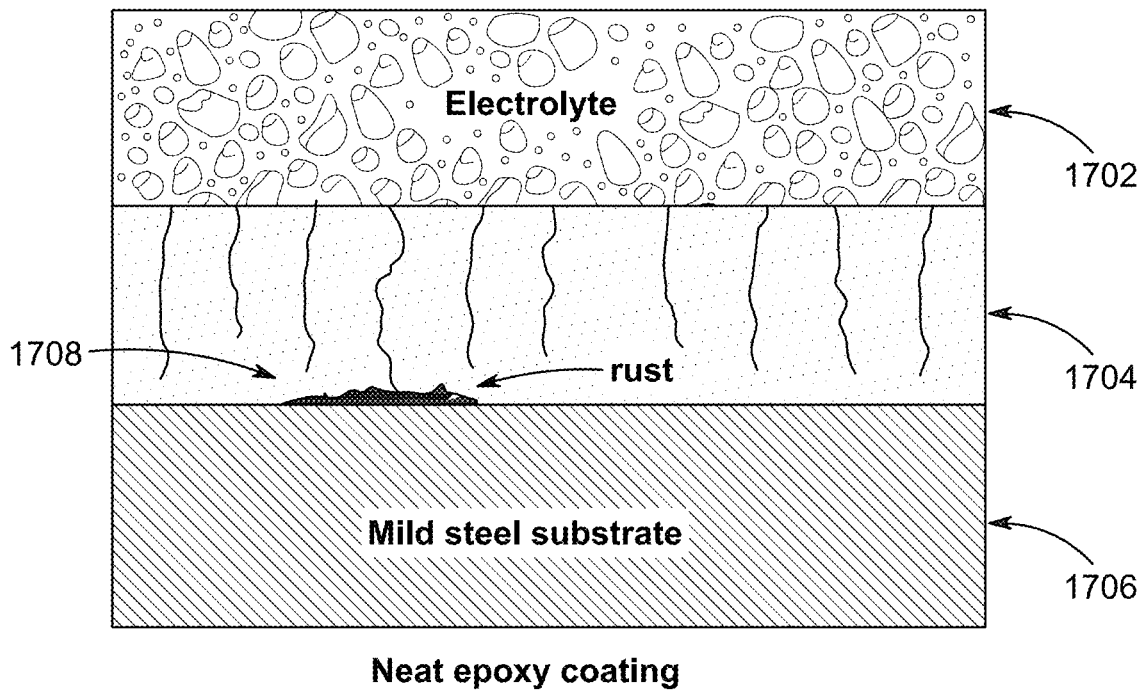
FIG. 17A is a schematic presentation of diffusion of electrolyte in MS specimens coated with neat epoxy coating, according to certain embodiments.
Figure 17B:
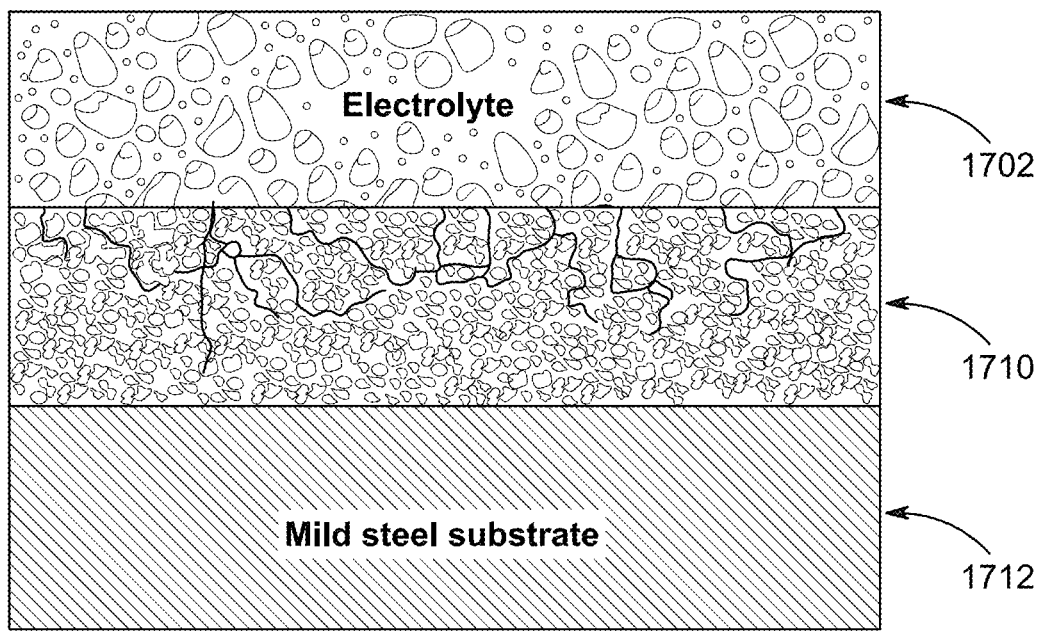
FIG. 17B is a schematic presentation of diffusion of electrolyte in MS specimens coated with the composite epoxy coating, according to certain embodiments.

FIGS. 17A-17B are schematic diagrams depicting the comparative barrier performance of the submicron-/nano-jute carbon composite epoxy coating. As a coated specimen (FIG. 17A) is exposed to a corrosive medium (here NaCl), the electrolyte 1702 penetrates into neat epoxy coating 1704 and with time the electrolyte 1702 reaches the metal substrate through pores in the coating and initiates corrosion reactions leading to corrosion of MS substrate 1706 and formation of rust 1708. Similarly, the electrolyte 1702 penetrates composite epoxy coating 1710 (FIG. 17B), however, presence of the uniformly distributed nano-jute carbon particles makes the coating compact and more hydrophobic, thereby reducing the permeability of water/electrolyte 1702 and the path becomes more tortuous. Hence, the composite epoxy coating is effective in delaying the penetration of electrolyte 1702 from reaching mild steel substrate 1712, as evident from the EIS, PDP, and salt spray results, thus protecting the MS substrate 1712 from corrosion.

The present disclosure provides the anticorrosive nanocomposite coating including the jute carbon which has improved the performance of generic coatings, such as the epoxy resins. The submicron-/nano-jute carbon provides efficient corrosion resistance performance to the nanocomposite. The incorporation of submicron-/nano-jute carbon in the coatings has improved the performance of the coatings by filling the micropores and acting as a barrier against the diffusion of corrosive species. Further, the submicron-/nano-jute carbon increases the surface hydrophobicity, decreases the wear, and improves the toughness and adhesion of the coating.

The submicron-/nano-jute carbon is obtained from the jute stick, and the agricultural waste material. The jute stick is 100% biodegradable, recyclable, and eco-friendly natural fibre. The jute stick is a good source of pure carbon. As the jute sticks are cheap, abundantly available, renewable, and environmentally friendly, the jute sticks were selected for obtaining submicron-/nano-jute carbon using techniques such as pyrolysis and high energy ball milling.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An anticorrosive nanocomposite consisting of:
   a cured epoxy; and
   jute carbon;
   wherein at least a portion of the jute carbon comprises graphitic carbon;
   wherein the jute carbon is in the form of flakes;
   wherein the flakes have flat top and bottom surfaces that are coplanar;
   wherein the flakes have a particle size of 0.05-15 micrometers ($\mu m$); and
   wherein particles of the jute carbon are dispersed in the cured epoxy.

2. The anticorrosive nanocomposite of claim 1, wherein the flakes have a particle size of 10-15 $\mu m$.

3. The anticorrosive nanocomposite of claim 1, wherein the flakes have a particle size of 50-500 nanometers (nm).

4. The anticorrosive nanocomposite of claim 1, wherein the jute carbon has 90-96 wt. % carbon, 2-5 wt. % oxygen, 0.05-0.2 wt. % magnesium, and 0.05-0.2 wt. % calcium, based on the total weight of the carbon, oxygen, magnesium, and calcium in the jute carbon.

5. The anticorrosive nanocomposite of claim 1, wherein the jute carbon is at least 60% amorphous.

6. The anticorrosive nanocomposite of claim 1, consisting of:
   0.1-10 wt. % jute carbon; and
   90-99.9 wt. % cured epoxy, based on the total weight of the jute carbon, and the cured epoxy.

7. The anticorrosive nanocomposite of claim 1, wherein:
   the cured epoxy is a blend of at least one epoxy resin and at least one hardener;
   wherein the blend comprises 80-95 wt. % epoxy resin and 5-20 wt. % hardener, based on the total weight of the epoxy resin and the hardener.

8. The anticorrosive nanocomposite of claim 7, wherein the epoxy resin is at least one selected from the group consisting of bisphenol A and bisphenol F.

9. The anticorrosive nanocomposite of claim 7, wherein the hardener is at least one selected from the group consisting of a phenol, an aromatic amine, an aliphatic amine, and a thiol.

10. The anticorrosive nanocomposite of claim 1, wherein a method of preparing the jute carbon comprises:
    cutting raw jute sticks into pieces less than 2 centimeters (cm) in size to form jute pieces;
    washing the jute pieces with water and heating to a temperature of at least 110 degrees Celsius (° C.) for 24 hours to form clean jute pieces;
    grinding the clean jute pieces into a powder and pyrolyzing at a temperature of 700-1,000° C. under an inert atmosphere for at least 5 hours, to form a pyrolyzed jute carbon; and
    grinding the pyrolyzed jute carbon into a powder to form the jute carbon.

\* \* \* \* \*